United States Patent
Sitrick

Patent Number: 5,830,065
Date of Patent: Nov. 3, 1998

[54] USER IMAGE INTEGRATION INTO AUDIOVISUAL PRESENTATION SYSTEM AND METHODOLOGY

[76] Inventor: David H. Sitrick, 820 Burchell, Highland Park, Ill. 60035

[21] Appl. No.: 645,678

[22] Filed: May 14, 1996

Related U.S. Application Data

[63] Continuation-in-part of Ser. No. 887,715, May 22, 1992, Pat. No. 5,553,864.

[51] Int. Cl.$^6$ ........................................... A63F 9/22
[52] U.S. Cl. .................................. 463/31; 463/35
[58] Field of Search .................... 463/30–35, 43, 463/42; 395/118–130, 152; 364/410; 356/376

[56] References Cited

U.S. PATENT DOCUMENTS

| | | |
|---|---|---|
| 4,149,716 | 4/1979 | Scudder . |
| 4,445,187 | 4/1984 | Best . |
| 4,521,014 | 6/1985 | Sitrick . |
| 4,539,585 | 9/1985 | Spackova et al. . |
| 4,572,509 | 2/1986 | Sitrick . |
| 4,688,105 | 8/1987 | Bloch et al. . |
| 4,710,873 | 12/1987 | Breslow et al. ........................ 463/30 |
| 4,885,702 | 12/1989 | Ohba ..................................... 395/119 |
| 5,369,736 | 11/1994 | Kato et al. ............................. 395/130 |

FOREIGN PATENT DOCUMENTS

| | | |
|---|---|---|
| 0 092 075 A1 | 10/1983 | European Pat. Off. . |
| 0 253 751 A2 | 1/1988 | European Pat. Off. . |
| 0 402 067 A2 | 12/1990 | European Pat. Off. . |
| 0 661 658 A2 | 7/1995 | European Pat. Off. . |
| 0 737 496 A1 | 10/1996 | European Pat. Off. . |
| 3275092 | 12/1991 | Japan . |
| 2 077 524 | 11/1995 | Spain . |
| 2287374 | 9/1995 | United Kingdom . |

*Primary Examiner*—Jessica Harrison
*Assistant Examiner*—Mark A. Sager
*Attorney, Agent, or Firm*—Sitrick and Sitrick

[57] ABSTRACT

An amusement park entertainment system that integrates an image of a patron into an audiovisual presentation. The patron enters a room where the lighting, sound, and scenery can be controlled. A standardized input sequence is obtained by computer automated/assisted process where user images (video cmaera input, voice parameters, etc.) prompting the user to provide certain views and voiced statements. Alternatively, photo scan or diskette/CD readers can accept user input image data. A one, two, or three dimensional image data representation of the user images is then generated, including the speech parameters of the patron. The image can later be manipulated to change the appearance of the image. This appearance change includes attire and adding tools relevant to the entertainment area used by the patron. The image can then be smoothly integrated into a preexisting audiovisual presentation, thus making the patron a synthetic actor in the production.

31 Claims, 23 Drawing Sheets

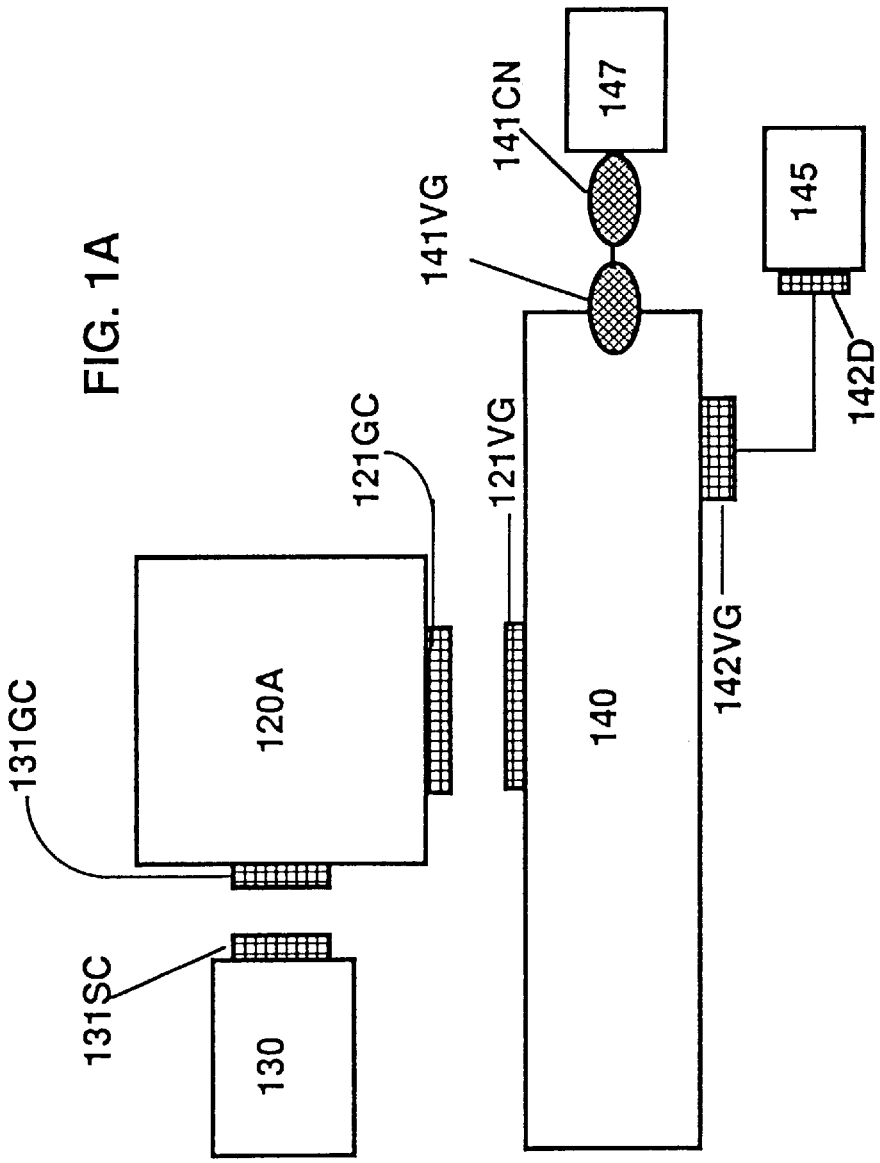

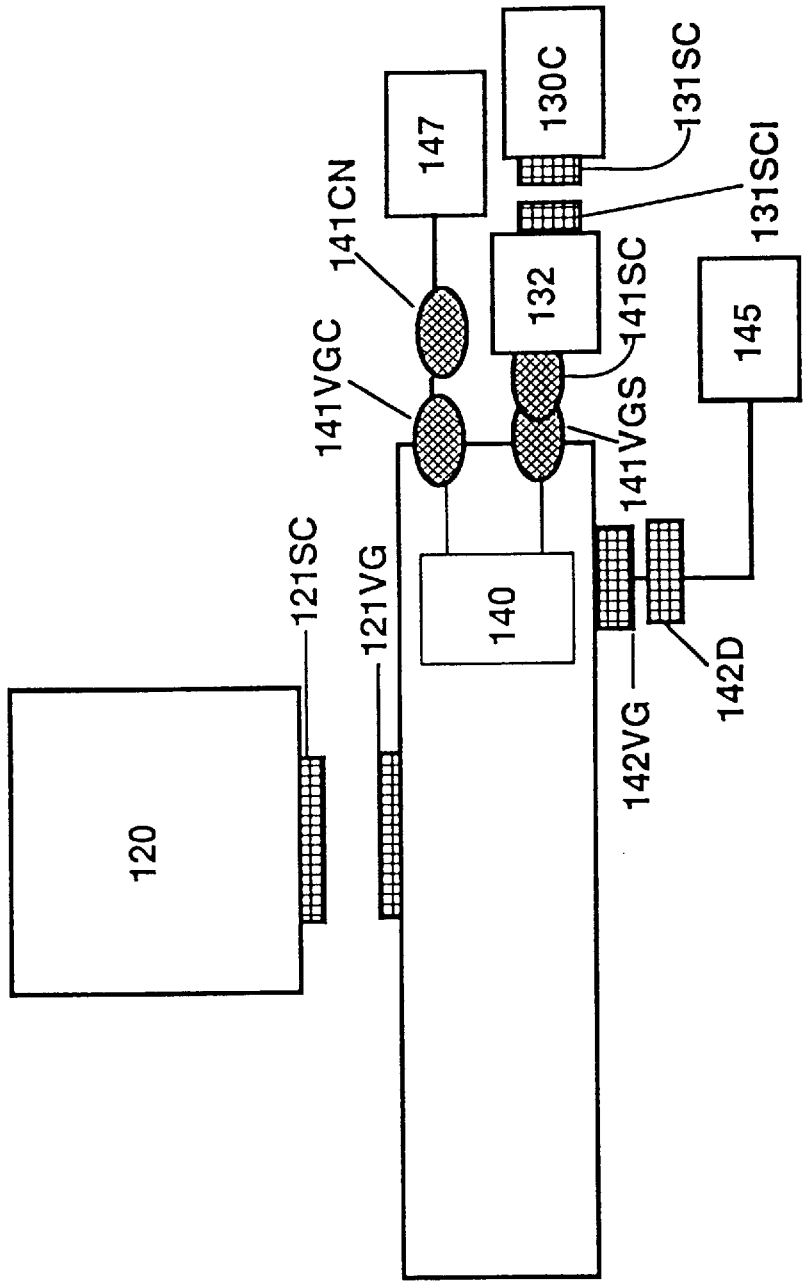

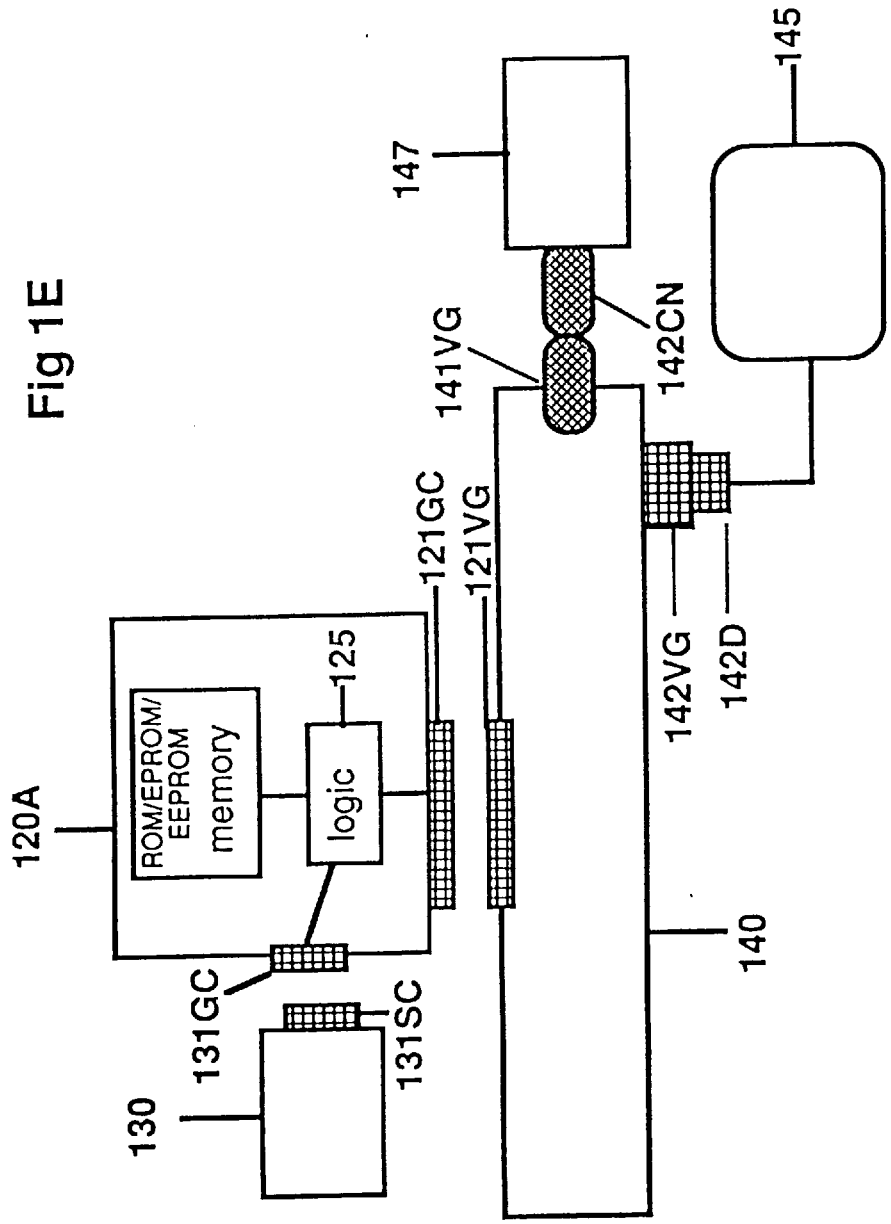

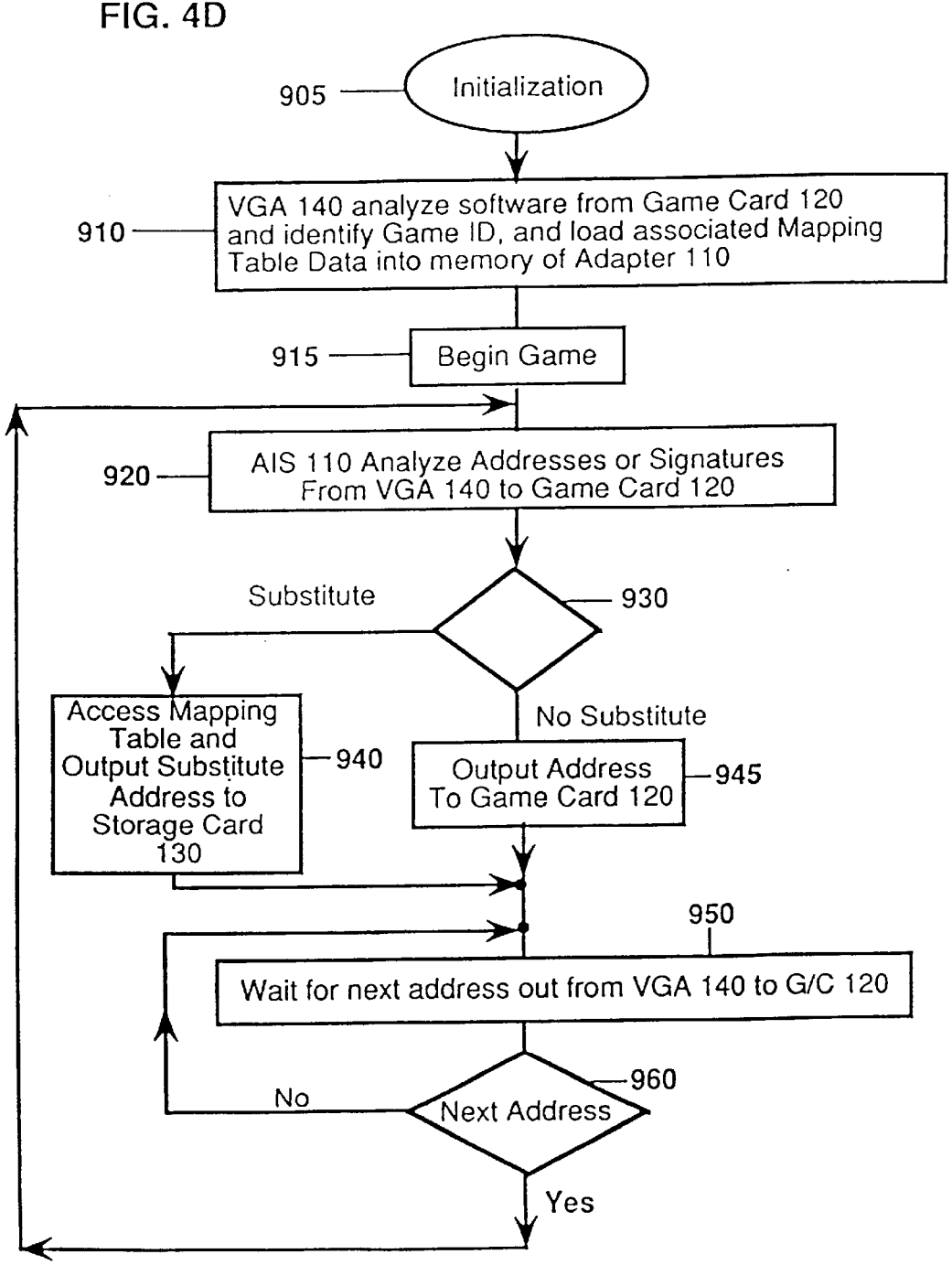

USER IMAGE INTEGRATION INTO AUDIOVISUAL PRESENTATION SYSTEM AND METHODOLOGY

This application is a continuation-in-part of co-pending U.S. Pat. application Ser. No. 07/887,715 filed May 22, 1992, now U.S. Pat. No. 5,553,864.

This invention relates to predefined video and audiovisual presentations such as movies and video games, and more particularly to an image development system and process for smooth integration of user-created images into a predefined video presentation, including, but not limited to, a video game player character image development system and methodology for smooth integration of user created video graphics into a predefined video, movie, or game system, and to an adapter interface system which provides for the utilization of a user visual image as a preselected character segment, such that the user visual image is incorporated into the audiovisual presentation of the movie or video game to which the adapter interface system is coupled.

Heretofore, video games and audiovisual presentations have been self contained, and have not provided the ability for the user to integrate in a user-defined or -provided visual or audio image. Subsequent to the invention of U.S. Pat. No. 4,521,014, video games have been created which utilized predefined digitized images in the video game which supplement the otherwise cartoon-like character and imagery of the game. Additionally, digital and analog video data have been merged with video games to get broadcast quality video for certain aspects of the video display for the video game, particularly in arcade games, but more recently in home video games with attached CD-ROM player. However, heretofore, there has been no system which has provided for the utilization of user provided or created visual images in the video game.

It is therefore an object of the present invention to provide a system which utilizes an image generated by an external source (of video and/or audio and/or computer generated), and integrates the image into and as part of a pre-existing audiovisual work (such as from a video game system or a movie or animation) which utilizes the user's image in the video game play or as a synthetic participating user image in the audiovisual presentation, such that the user image is incorporated into the audiovisual presentation of the user interactive video game.

It is further an object of the present invention to optimally benefit from the user video and audio image in video games and to develop a methodology for creating video games compatible with user image integration concepts.

It is an additional object to provide a system and methodology for orderly transfer and integration of the user created visual image, or images, into the video game.

It is a further object of the present invention to provide various means for users of video game apparatus to capture and/or provide for placement and storage of the user's visual image onto a medium which can be coupled either via an adapter or directly to one or more game systems and/or game cartridges which connect to the game systems.

BACKGROUND OF THE INVENTION

Video disk games and cartridge video games, where the outcome is variable based on user input, are popular forms of entertainment. They are in use in both homes and video arcades.

Video games are typically played from a stored digital program. These programs are made up of multiple images that interact as instructed by both the program and a controller operated by a user. There is no provision for integrating a user image into the program unless a character is present in that location.

Some amusement parks provide video entertainment by playing old movie clips incorporating select audience members. A live camera captures the audience member in front of a blue background. The blue color is filtered out of the signal from the audience member camera and the signal is combined with the video signal of the old movie clip. This gives the impression that the audience member is acting in the old movie clip. All of this is typically done in real-time.

A problem with this approach is that a complete set-up is needed (a video camera, a blue-screen, a compositing computer system, etc.) and, the incorporation of the audience member is crude in that the audience member's image overlays the movie clip and is not blended into the movie. Using this approach, there can be no realistic interaction between the audience member and the cast in the movie clip. There is a resulting need for an entertainment system that facilitates realistically integrating a user's image into a video presentation or video game.

SUMMARY OF THE INVENTION

The present invention encompasses an entertainment system capable of integrating images into a predefined audiovisual presentation. The system comprises an image generator that generates a user image of an amusement park patron. The image is stored on a storage medium that is transportable. In one embodiment, the storage medium is usable for admittance into each of the entertainment areas of an amusement park.

An audiovisual source provides audio and video signals received by a controller for integration into an audiovisual presentation. The controller analyzes the audio and video signals and modifies the signals to integrate the user image into the audiovisual presentation. This enables the user image to participate in the audiovisual presentation as a synthetic actor.

In accordance with one aspect of the present invention, a user image in video game or other audiovisual presentation system design methodology and architectural structuring, in combination with a user image development system, provides an environment whereby a user can create a video or other image utilizing any one of a plurality of input device means, and whereby the user created image is provided in a format and through a medium by which the user created image can be communicated and integrated into the audiovisual presentation, and game play of a video game. The video game design complements this, and game integration means are provided for mapping user created image data into the video game system structure such that the user image is integrated into the video game play and presentation.

A game image and logic structuring is provided such that user created image data can be easily integrated into the game structure for integral operation in a monolithic and homogeneous fashion. A class of games is made possible, which are playable under whatever rules are set forth by the game creator, wherein all of these games integrate with the various ones of the user created visual images through a common format and methodology. Means for user image creation allows the user to input the user's player representative characters. This input can be by any one of a number of means such as by original creation by the user by any means (from audio analysis to a graphics development system, by user assembly of predefined objects or segments, by digitization scan of an external object such as of a person by video camera or a photograph or document [by a scanner, etc.]). The user image creation system creates a mappable (absolute or virtual) link of the user defined images for integration into other graphics and game software packages, such as where the user defined or created visual images are utilized in the video presentation of the video game as a software function such as one or more of the preselected character imagery segment(s) associated with the user's play of the game or as a particular character or other video game software function in the game (e.g., hero, villain, culprit, etc.) and/or a particular portion and/or perspective view of a particular character, such that one or more of the user visual images and/or sounds is incorporated into the audiovisual presentation and play of the resulting video game.

A user image linker system and methodology provide for user image to application software mapping and linking of user image and integration data (e.g., such as to games packages, graphics and other applications software, sound synthesizers, high level language development software, etc.), and further provides mapping and linking of user image and integration data to operating systems such as for standard personal computers (e.g., the Macintosh, MS-DOS, WINDOWS, OS/2, Apple II,CP/M, MSX, UNIX, Amiga, etc.) and for video game operating systems (such as the Sega Genesis, Nintendo NES, or Super NES, etc. Linkage to operating systems can be structured in any conventional manner such as a callable subroutine, or an operating system function call (independent of any application software).

In accordance with another aspect of the present invention, an adapter interface system couples into the video game apparatus, and provides means for the user to create one or more user images, means for storage of formatted user image data onto a storage medium, and means for interfacing with a video game system to utilize the user image from the storage medium.

In accordance with one embodiment of the present invention, there is provided a video game interface adapter system, comprised of a video interface for utilization of video from an external video source (e.g., camera, VCR, etc.) for digitizing, formatting and storing the external video source image as user image data and storing the formatted video image data onto the storage medium, which can thereafter be independently utilized to couple the user's formatted video image to the video game system for incorporation therein. A user image medium interface connector and subsystem, couples user visual image data from previously programmed user image cards for integration of the user visual images into the video game play and presentation of the video game apparatus to which the video game adapter interface system is coupled.

In accordance with another aspect of the present invention, a home video game intercept adapter interface system is provided, which couples to a video game system and to the user image storage medium, and which couples to non-user image based video game software (especially valuable for use with preexisting game software), such that the intercept adapter interface system intercepts requests for respective predefined character image data which are associated with the user images, and substitutes the respective image data for the user images in place of the intercepted images as appropriate, in a manner transparent to the existing software. The intercept adapter system is coupled to the game connector of a host video game system ("VGS") which provides a host video game display, and an associated game card/cartridge containing the game software which provides game data signals. The intercept adapter system is comprised of an interface for coupling the game signals from the game connector to the adapter system. An interface couples signals to and from the external game cartridge which contains rules and instructions for an associated video game, to the adapter system. An analysis system analyzes the signals associated with the predefined character imagery segments associated with the user images and selectively modifies certain ones of the game data signals to substitute therefor the data signals for user images associated with preselected character imagery segments, and selectively outputs the substituted certain ones of the game data signals in place of the initial respective ones of the game data signals to the host video game for utilization therein, whereby the user image is associated with the preselected character imagery segment so that the user image is incorporated into the audiovisual presentation of the video game.

In accordance with another aspect of the present invention, a self service booth can be utilized at various locations supporting the sales of the user image in video games, both home and coin operated games. The booth provides a means for permitting the user to create and save the user information on a storage medium, which can then be more simply coupled to an interface connector on the home video game system or to an arcade game. The booth can also provide attract mode video game display presentations of various different video game display presentations where the user image is integrated into the attract mode video game display presentation. Alternatively, or additionally, a service bureau can be utilized to provide services via mail-in or walk-in operations.

These and other aspects and attributes of the present invention will be discussed with reference to the following drawings and accompanying specification.

BRIEF DESCRIPTION OF THE DRAWINGS

FIG. 1A illustrates an embodiment of a user image adapter interface system used in conjunction with a video game apparatus, a user image storage card, and a video game software or firmware card, in accordance with the present invention;

FIG. 1C illustrates the system of FIG. 1A, except that the storage card is coupled to an input/output port of the video game apparatus instead of to the game cartridge connector, in accordance with the present invention;

FIG. 1E illustrates an embodiment of a user image adapter interface system combined within a game card, used in conjunction with a video game apparatus and in accordance with the present invention;

Figure 1B:
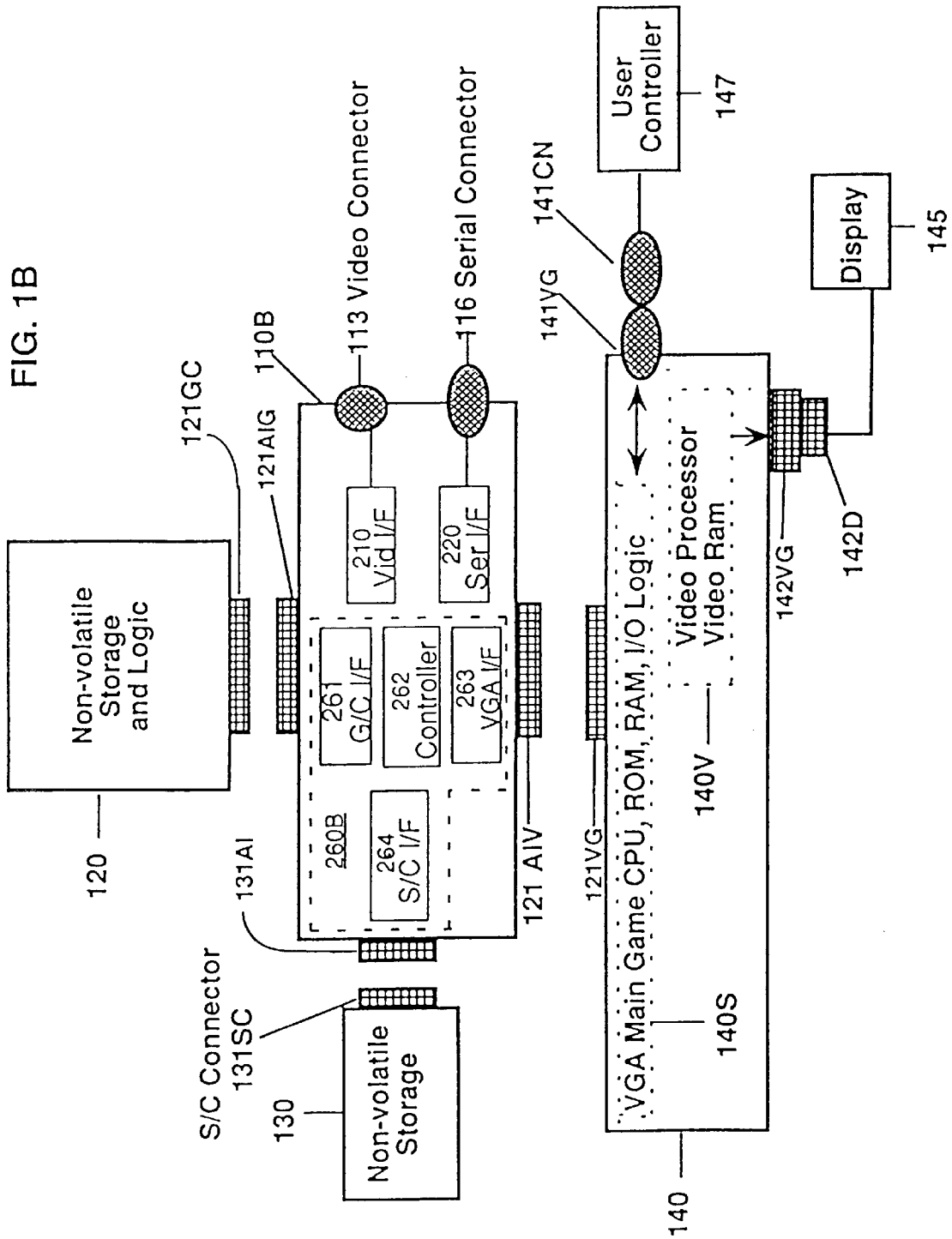
FIG. 1B illustrates the user image adapter interface system of FIG. 1A that additionally includes means for user input of user visual images and storage onto a user visual image storage medium in accordance with the present invention.

There are many complex subject areas cooperatively intertwined in the present invention, and discussed in the description herein.

Ample textual material documents each of the subject areas. Therefore, in the interest of conciseness and to aid in more clearly understanding the present invention, the following references are disclosed and incorporated herein by reference:

U.S. Pat. No. 4,521,014 entitled, "Video Game Including User Visual Image."

U.S. Pat. No. 4,710,873, entitled "Video Game Incorporating Digitized Images of Being Into Game."

There are a number of texts (latest editions) providing detailed information on computer graphics, digitization, and formatting of digitized video information, and interactive computer graphics, including data structures, algorithms and languages: *Principles of Interactive Computer Graphics*, by William M. Newman and Robert F. Sproull, published by McGraw Hill; *Fundamentals of Interactive Computer Graphics*, by J. D. Foley and A. Van Dam, published by Addison West Publishing Co.; *Procedural Elements For Computer Graphics*, by David Rogers; Graphics Gems, edited by Andrew Glassner; *Digital Image Warping*, by George Wolberg; *Graphics Gems II*, edited by James Arvo; *Interactive Computer Graphics*, by Wolfgang K. Giloi, published by Prentice-Hall; *Computer Vision*, by Dana H. Ballard and Christopher M. Brown, published by Prentice-Hall; *Digital Processing of Speech Signals*, by L. R. Rabiner and R. W. Schafer, published by Prentice-Hall, by Bell Laboratories, Inc.; *Tutorial: Computer Graphics. Second Edition*, by John C. Beatty and Kellogg S. Booth, published by the Computer Society Press of the IEEE Computer Society, Institute of Electrical and Electronics Engineers, Inc.; *Tutorial of Selected Readings and Interactive Computer Graphics*, by Herbert Freeman, published by the IEEE Computer Society, and later published documents by the IEEE; *SIGRAPH* proceedings, 1981 to 1995: Course Materials from those proceedings. Additionally, there are numerous application reports and data sheets and magazine articles regarding utilization of new technology, and existing technologies in such areas as digital signal processing, video image signal capture, digitization, formatting, storage, compression, etc. There are also numerous reference materials and off-the-shelf products available for audio capture, digitization, formatting, compression and storage.

Specifics of particular techniques such as video and audio signal capture, digitization, storage, compression and formatting are not limitations on the present invention, as any of a number of available techniques and technologies can be utilized, including off the shelf available products ranging from stand-alone systems, chip sets, BUS-STANDARD plug-in board systems (such as NU-BUS, PCM-CIA, IEEE-488, Multibus I and II, S-100 Bus, Standard Bus, PC-AT bus, Micro Channel Bus, etc.). Available stand-alone systems, Subsets of technology of the kind developed and used in a 1990 model of an Eastman Kodak Company's "Hybrid Imaging System" performed 6 megapixel/second image scans, initially storing approximately 18 megabytes (3,078 8 bit deep samples) of data for a 35 mm film image (each second), image and data compression of 3:1, compressed in real-time. The Kodak Photo CD System takes images from 35 mm film, digitizes, compresses and formats the image data for storage on disk to be replayed on computer or television monitors.

The commercially available Canon (also Nikon, Apple and other brands of) Still Video Camera records images as single frames of video on floppy disk and, with a Canon Digitizer attachment, permits interface for storage as an ordinary graphics file on a personal computer (e.g., Apple Macintosh). Other brands, such as Apple's, store the captured still frames in FLASH EEPROM and dump images straight to a host CPU via a serial interface. Motion video can be captured, digitized, and stored in computer memory or on disk, and numerous commercially available Apple Macintosh or DOS/Windows compatible plug-in boards from TruVision, Radius, Intelligent Resources Integrated Systems' Video Explorer, etc. In addition, the techniques and technologies being brought to "virtual reality" lend themselves to application of the user visual image in a video game invention and to the teachings of the present invention.

Audio signals may be equivalently processed and utilized. These represent additional extensions of the present invention. Audio signals go beyond simple spoken words and phrases, or explosions or other sounds. Audio signals can be analyzed and processed to generate voice parameters which are then used by the system to synthetically generate a voice corresponding to and sounding like the audio signals from which the voice parameters were modeled (e.g., the actual user's voice, tonal quality, pitch, etc.).

DETAILED DESCRIPTION OF THE ILLUSTRATED EMBODIMENTS

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

Referring to FIG. 1A, a user image adapter interface system 110 is coupled to a video game apparatus 140. Electrical signals are coupled between the video game apparatus 140 and adapter interface system 110, including address, data, power, and control signals. The video game apparatus 140 is comprised of a video game computing system including a microprocessor, ROM, RAM, a video interface (that may include its own video processor and video RAM or may use and share the function via the microprocessor), which video interface couples through mating connectors 142VG for coupling to a mating connector 142D on a display monitor 145. The video game apparatus 140 also includes input/output ("I/O") that provides for coupling of signals between the video game computing system via connector 141VG and a user controller 147 via connector 141CN. One or more controllers 147 may be coupled to a specific I/O port or, alternatively, there may be multiple I/O ports for coupling of multiple inputs independent of one another.

Examples of video game apparatus 140 include the Sega Genesis video game system manufactured by Sega of America, Incorporated. This game uses a Motorola 68000 microprocessor, has ROM and RAM, a video display processor, video memory, a sound processor, and I/O processing capability. Nintendo video game systems for the home including the Nintendo Entertainment System (NES) and the Super NES Systems respectively utilize eight and sixteen bit processors. Many other dedicated video game apparatus exist such as from Atari, NEC, Sony and others. Newer games include 32 bit and 64 bit processor-based games with ever increasing amounts of RAM, ROM, CDROM, and processing power.

As described later herein, the present invention is also applicable in non-video game embodiments, such as prerecorded movies, animations, etc.

The present invention also extends to include personal computers that are operated as video game apparatuses or as non-game audiovisual presentation apparatus, including set-top boxes. The adapter interface system can be used as a plug-in board coupled to a computer electronic signal interface bus (such as in the Apple II, Apple Macintosh, IBM PC and compatibles, Amiga, Next, Sun, Hewlett Packard, etc.) or coupled to a serial or parallel port therein. The user controller encompasses switches, joysticks, keyboards, microphone, camera, and other means for user input of stimulus to the system.

The game cartridge 120A is comprised of a storage medium (such as ROM, EPROM, CD-ROM diskette) that contains the video game software rules, instruction, and data. These are used in conjunction with the video game apparatus 140 to provide a video game display presentation and video game play with user responsive input.

The adapter interface system is included within the storage card 130 and is coupled via a mating connector 131SC to mating connector 131GC to the game cartridge 120A for direct coupling to the game connector bus. This configuration works especially well with games that were created to look for user images in a defined and/or separate address space and to selectively provide for the substitution of selected certain ones of predefined game character imagery segments with respective user visual images. This provides a low cost adapter interface system, but requires that some other external means be used to store user visual image data onto the storage card as is described herein. This is a preferred embodiment where the goal is low cost mass merchandising (and where other means are provided for users to get user visual images stored as user visual image data onto the Storage Card (e.g., such as the systems of FIGS. 1B, 5A–B, and/or coordinated service bureau processing for Storage Cards to give users user image data storage).

In accordance with one aspect of the present invention, the adapter interface system 110 provides image integration, controlled via software (either self-contained within the adapter interface 110 or provided by a Game Card 120 or storage card 130) that links image data packets to game software functions and that can then be incorporated into the overall video game audiovisual presentation in combination with a predefined set of complimentary audiovisual imagery segments according to a predefined set of game rules.

Game software functions are comprised of, for example facial views: front, side, smile, frown, happy, sad, mad, and mean facial photographs. A subset, a super set, or a different set of these facial photograph views can be used. The user can create his or her own spacecraft, race car, hero, villain, weapon, monster, or other preselected character functions (e.g., icons, sub-image identifier segments). Additionally, third party supplied user visual images (e.g., clip art, vendor supplied substitute alternate game character images, etc) can be used.

Image integration can be provided via a universal software package for linking user visual image data to all games of the user created variety (e.g., for multiple cross-platform compatibility). The integration can also be provided in numerous custom tailored software packages for each game or group of games to permit user image data packets to be linked and integrated into the purchased game software such as for vendor proprietary systems.

Game display functions can optionally include Sub-Image Functions. Sub-Image Functions are any separable portion of the presentation (an element [e.g., arm, torso, face, ear, hand, etc.] of a predefined character image, etc.).

User Image data can represent video, audio, control, and other information such as (1) signal parameter data for a multitude of purposes such as modeling and rendering, or for alteration of image data, for texture wrapping of a User Video Image onto a predefined character image so as to effectively wrap the user image over the predefined character image; (2) behavioral profile rule data to adjust parameters for behavioral performance of a displayed character image; (3) macro commands for user or adapter interface system control of user image participation in the presentation.

Referring to FIG. 1A and Table I, a non-volatile storage medium 130 (for example a Storage Card [EEPROM or/and RAM], a floppy disk, optical, etc.) stores image data packet (i.e., .IDP) files, and image integration software links the .IDP files from the storage medium 130 for combinational mapping into the application software purchased video game. Thereafter, one or both of real-time play with the resultant combinational mapping and/or storage of .IDP files onto a non-volatile memory subsystem part of (or separate from, but attached) to the game cartridge, so as to create an integral self-contained video game.

Alternatively, the separate non-volatile .IDP files can be used as part of the game initialization procedure and .IDP files can be stored in read/write memory (e.g. EEPROM or RAM) so as to be variable from game to game. The files can also be stored onto Smart Cards, Game Card writable memory, floppy disk, etc., or integrated into the appropriate image files of the game. The files are then either real-time mapped into game play or automatically integrated at start-up as a part of the game initialization procedure whereafter those .IDP files remain part of the game structure unless and until changed during a future initialization procedure. Additionally, the integration of User Images into the video game can be changed in the middle of a game play, such as by hitting a switch, or as a game award.

Memory Address Space is determined by the choice of Video Game Apparatus ("VGA") 140, and usually by the choice of microprocessors and operating software therein. For example, a 32 bit physical address yields 4 Gigabytes (GB) of address space. However, the VGA system 140 with attached game cartridge and Storage Card would typically use only from a few hundred kilobytes (KB) to a few megabytes (MB), as shown in the Memory Map illustrated in Table I.

Image data packets consist of image data and headers that identify what type of data they contain, data regarding the height and width of the image, data regarding the amount of data associated with each pixel, data regarding whether the pixel colors are determined by a color look-up table (and, if so, either a pointer to or listing of the color look-up table), data regarding whether the data is compressed (and, if so, necessary information such as the type of compression needed to decompress it), data regarding scaling factor pointers to sound data, and other data normally associated with image data files such as the IFF standard, etc.

A detailed discussion and illustration of the .IDP file format and methodology is provided in the discussion of Tables II and III hereafter.

TABLE I

MEMORY MAP

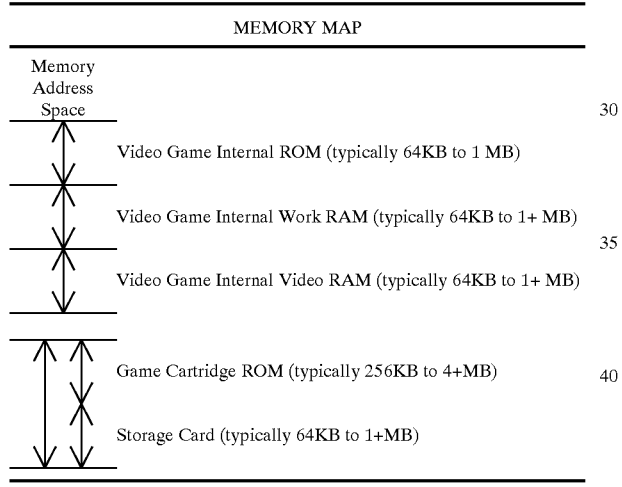

Memory Address Space

Video Game Internal ROM (typically 64KB to 1 MB)

Video Game Internal Work RAM (typically 64KB to 1+ MB)

Video Game Internal Video RAM (typically 64KB to 1+ MB)

Game Cartridge ROM (typically 256KB to 4+MB)

Storage Card (typically 64KB to 1+MB)

TABLE II

| ADDRESS 00: PACKET HEADER | 0 | ID OF USER IMAGE |
| --- | --- | --- |
| | 1 | DATA RE PACKET STRUCTURE, SIZE, CHECKSUM, ECC CODEWORD, ENCRYPTION, ETC., SINGLE/MULTIPLE UI FLAG, SINGLE/MULTIPLE PCI FLAG, ETC. |
| ADDR02: UIV SIZE IN BYTES, | | Offset Index Pointer to Start Address <X1> of UI Data |
| 03: UIV SIZE IN PIXELS | | |
| 04: ASSOC. PCI DATA | 5 | ID |
| | 6 | SIZE IN BYTES |
| | 7 | SIZE IN PIXELS |
| | 8 | ADDRESSES ON GAME CARD FOR PCI |
| ADDR <X1> USER IMAGE DATA | | (begins at Address 08 and continues until a delimiter at Address XN). |

Table II illustrates a specific example of a .IDP file format. Addresses 00 to 08 to XN form the .IDP file packet. The illustrated .IDP file packet is broken into fields as follows:

| ADDRESSES | FIELD |
| --- | --- |
| 00 TO 01 | .IDP PACKET HEADER |

TABLE II-continued

| | |
|---|---|
| 02 TO 04 | UI HEADER |
| 04 TO 07 | PCI HEADER |
| 08 TO <X0> (as needed) | PCI ADDRESSES ON GAME CARD = ADDRESSES WHICH VGN 140 WILL REQUEST IN ATTEMPT TO GET PC1 |
| X1 TO XN | UI DATA |

For multiple User Images, and/or a selection of multiple Predefined Character Images, bit flags are set in memory locations in the Packet Header of the .IDP file stored on the Storage Card A predefined memory locations serves as a Pointer Register and is loaded with the starting address for the Table multiple mode Table of Contents, as illustrated in Table III.

TABLE III

| MEMORY ADDRESS | MEMORY CONTENTS |
|---|---|
| ADDR PR | ZZ |
| ADDR ZZ | # OF UI's, # PCI's |
| ADDR ZZ + 1 | ADDR 00 for UI #1 |
| ZZ + 2 | ADDR 00 FOR UI #2 |
| ZZ + N | ADDR 00 FOR UI #N |
| ZZ + O | ADDR 05 FOR PCI #1 |
| ZZ + P | ADDR 05 FOR PC #2 |
| ZZ + E | ADDR 05 FOR PC #N |

For new Game Card designs, the PCI data is read from the Game Card (e.g., by the VGN or AIS) and is stored in a writable storage area (of the Storage Card or in the AIS 1100).

Many types of image input means can be provided, such as photoscanners, video cameras, video tape player, compact disk, computer output, still camera, and microphone. Photoscanners can provide .IDP files for two dimensional photographic text and images. Video cameras can provide input of either live or prerecorded images for conversion and storage as .IDP files. Users can connect the equipment they already have at home to an adapter interface system that connects to their home video game system and game cartridge, as discussed hereinafter.

Special booths (see FIGS. 5A–B), having all the necessary self-contained equipment, could be placed in stores selling the video game apparatus and game cartridge software, and a fee could be charged. Alternatively, a Service Bureau setup (e.g., see FIG. 5) can provide for the mail-in of photographs, VHS tapes, diskettes, etc. wherein a return Storage Card or diskette with the .IDP files on it is sent by mail from one or more centralized mail-in sources. For example, facial views: front, side, smile, frown, happy, sad, mad, and mean facial photographs, or a subset (a super set or a different set) of these set of facial photographs views can be used, and a universal structure can be created for facial related games for each one of the vendor's or for all vendor's by acceptance of a common .IDP standard.

There are numerous video data formatting, compression/expansion, encoding/decoding alternatives. They range from the well known and published to the proprietary ones available for purchase/license such as from board manufacturers and game manufacturers. Eastman Kodak has a "PhotoCD" service that permits users to have regular camera film developed and up to 100 photos provided on a compact disk that plays in a regular audio compact disk player and can be interfaced into a computing system.

In the illustrated embodiment, the structure standardizes on relative offset and location of .IDP files, from the beginning of the .IDP files, such that individual .IDP images can be uniformly selected for the appropriate emotion for integration into the class of "facial" video games, or the appropriate function for integration of the user visual image into a UVI-game. Of course, the present invention encompasses beyond facial views, to further cover heads, full body, hands, or pictures or images of anything.

Additionally, in an alternate embodiment, user voice signals (or voice modeling parameters therefor) are captured, digitized, formatted and stored. A user voice interface system is provided, as a subsystem of the user image system, providing for the input, capture, digitization, storage, and formatting of the user's voice image as a subset of the .IDP file.

A whole new edge is provided to "hooking" people into video games, (figuratively and literally) a rejuvenation from the slump of the 1980's where a threshold was reached with games like Pong, Space Invaders, Pac Man, and Zaxxon. Utilizing the present invention, the human ego is brought to play in the game. Since the user creates player representative characters as well as other functional images for use in the play and/or display of the video game, the game presentation is in fact partially the creation of the user.

The user's image creation system provides player representative character image packets having a predefined file structure, and can be used to determine the functional and structural mapping of the user visual image to the video game and its software functions. In the illustrated example, image data packet files (".IDP") are created for storage in memory and on floppy disk.

.IDP files represent a methodology and structure that, when uniformly followed, allows smooth integration of user created video images into a broad range of different video games, commonly structured to integrate with the .IDP files. For stand-alone applications, many processes/structures can be selected from to optimize a particular application.

In a preferred embodiment, user visual image data utilization is expanded beyond associative replacement predefined character images and existing game display functions. New game display functions can be created specifically to utilize user visual images. For example, user visual images and/or associated sounds can appear as a "newscaster," a "cameo guest, or a "synthetic actor" with predetermined actions (either functional or superfluous) during a video game where there are either none, one or many other user visual images utilized in association with predefined game character and game display functions. In the generalized non-video game audiovisual presentation, icons of user visual and sound images are integrated into predetermined stored audiovisual presentation.

In the preferred embodiment, each video game card 120 includes data stored within its storage memory of the address map table of displayable graphics functions, for use with a character select program that explains and allows substitution of the available player character functions for association with selected image packets.

These image packets can be created via many forms of user image entry, such as by direct user image input by input stimulus devices such as a mouse, light pen, keyboard, joystick, or via a video or still camera, document scanner means, etc. Additionally, entry can be provided by dealer or factory support means as discussed above, or via a communications link such as a modem.

Image data packets can be converted from graphics initially created with any standard graphic, drawing or other creation program such as "MacPaint," "PC-Draw," "Corel-Draw," Adobe Illustrator Photoshop, modeling programs, or CAD/CAM programs. Custom or off-the-shelf software can also be used. The packets can additionally be created via image capture such as through a video camera originated input that is digitized, compressed and encoded. A conversion utility (software or hardware) can be used to convert from standard graphics formats to the .IDP format and structure.

Game initialization and linkage to image data packets can be accomplished either (1) automatically during start-up or real-time during game play, or (2) by execution of the character select program. This allows the prospective player to display and select which player character to associate with which game character function. As discussed above, this can be provided automatically as a part of the game initialization or can be provided as a software utility to initially run before playing the game.

For automatic initialized character selection, the character selection program makes a copy and assigns a file name. It then creates a link table entry in the master game database for each association of the user created video image with the game function.

The Storage Card can also provide storage for saving user game scores, parameters of specific games so the user can continue from where the user left off, etc. Also, the Storage Card can provide for system security data storage.

FIG. 1B illustrates the user visual image adapter interface system of FIG. 1A that additionally includes means for user input of user visual images and storage onto a user visual image storage medium in accordance with the present invention.

Referring to the user visual image adapter interface system 110B in FIG. 1B, multiple additional subsystems are present beyond that illustrated in the embodiment of FIG. 1A. The adapter interface 110B is coupled via respective connectors 121AIG, 131AI, and 121AIV to the Game Card 120, Storage Card 130, and Video Game Apparatus 140 via respective connectors 121GC, 131SC, and 121VG. These include a video interface subsystem 210 that couples to a video connector 113 that in turn couples to an external source of analog and/or digital video signal input. Examples of an external video source includes a video camcorder, video tape player, and laser disc player.

Additionally, a serial interface subsystem 220 couples to a serial connector 116 that couples to an external serial interface. This connection allows the transfer of image data from an external computer or data storage medium, in digital format, directly to the adapter interface system 110B for formatting and storage. Game card interface 261, storage card interface 264, video game interface 263 and controller 262 comprise a common base system 260 of the adapter interface 110B, although controller 262 also can be varied for FIGS. 1A versus 1B.

The adapter interface system 110B couples to a video game cartridge 120 and to the video game cartridge connector 121VG of a host video game that has a display 145. The adapter interface system 110B is comprised of an interface 210 for coupling video source signals from an external video source to the adapter system. The adapter interface system 110B also has a storage medium 130 for selectively storing and selectively outputting user visual image data. A video processing system converts analog video source signals received from the external video source to a digitized and formatted video information data signal in response to the rules and instruction data contained in control program storage memory.

The display of the host video game is responsive to the video information signal to provide an audiovisual presentation that is a combination of the predefined video imagery segments of the host video game and the external video source based video information signals. Audio input, conversion, and integration can additionally be provided.

The adapter interface system 110B is coupled to an external storage medium, such as a Storage Card (e.g., Smart Card, floppy disk, or CD-ROM). This permits the coupling via external connectors 131SC and 131AI that mate between the adapter interface system 110B and the external storage medium 130. The Storage Card stores formatted and mapped image data from the adapter interface system 110B as well as a table of information regarding the mapping of the image data. The Storage Card also has the identification of which types of image data are present, and where they are mapped into the storage memory of the external storage card 130.

The adapter interface system 110B coordinates the user creation of user visual images. The adapter interface system 110B also downloads graphic information for use via formatting and analysis to permit the transformation of user image information (received through the video interface subsystem coupled to connector 113 and the serial interface subsystem coupled to serial connector 116). This information is processed for proper sizing, cropping, and identification (e.g., of poses) such as through interactive communication with the user with sound and visuals using the external monitor and speaker 145 and using the user controller 147 and/or an additional input mechanism to allow user interaction.

Alternatively, the adapter interface system provides for automatic processing so as to ultimately provide formatted data for storage on the external storage card 130 that can then later be utilized in conjunction with the video game apparatus 140 and the game cartridge 120. This provides a video game wherein the visual image is integrated into and becomes a part of the game presentation in place of a predefined game character.

Referring to FIG. 1C, an alternate embodiment of FIG. 1A is illustrated, where a storage card interface system 132 is coupled to an I/O port 140 via I/O connectors 141VGS and 141SC. The storage card interface 132 couples to the storage card 130 via mating connectors 131SCI and 131SC. This embodiment has cost advantages relative to the system of FIG. 1A, but has slower relative throughput and data rate.

This can be partly compensated for by downloading to RAM in the game cartridge 120C, or in the video game apparatus 140.

The advantage of the system of FIG. 1A is that it permits direct coupling to the computer system bus via the game connector so that the storage card 130 can be directly coupled into the memory space of the video game apparatus' 140 CPU. The storage card 130 can be used within the address space of the video processing system in a manner so as to substitute the user visual images for predefined game character images as appropriate in accordance with the rules and instructions of the game and the protocol and methodology of utilization of user visual images.

An alternative to FIG. 1C, uses an existing interface for compact disk ("CD") (or other existing storage interface), such as via an I/O Port, so as to couple User Images from a User Image CD for storage in memory of the Video Game System for use therein. Writable CD technology is adaptable to both a home adapter and a service bureau approach.

Figure 1D:
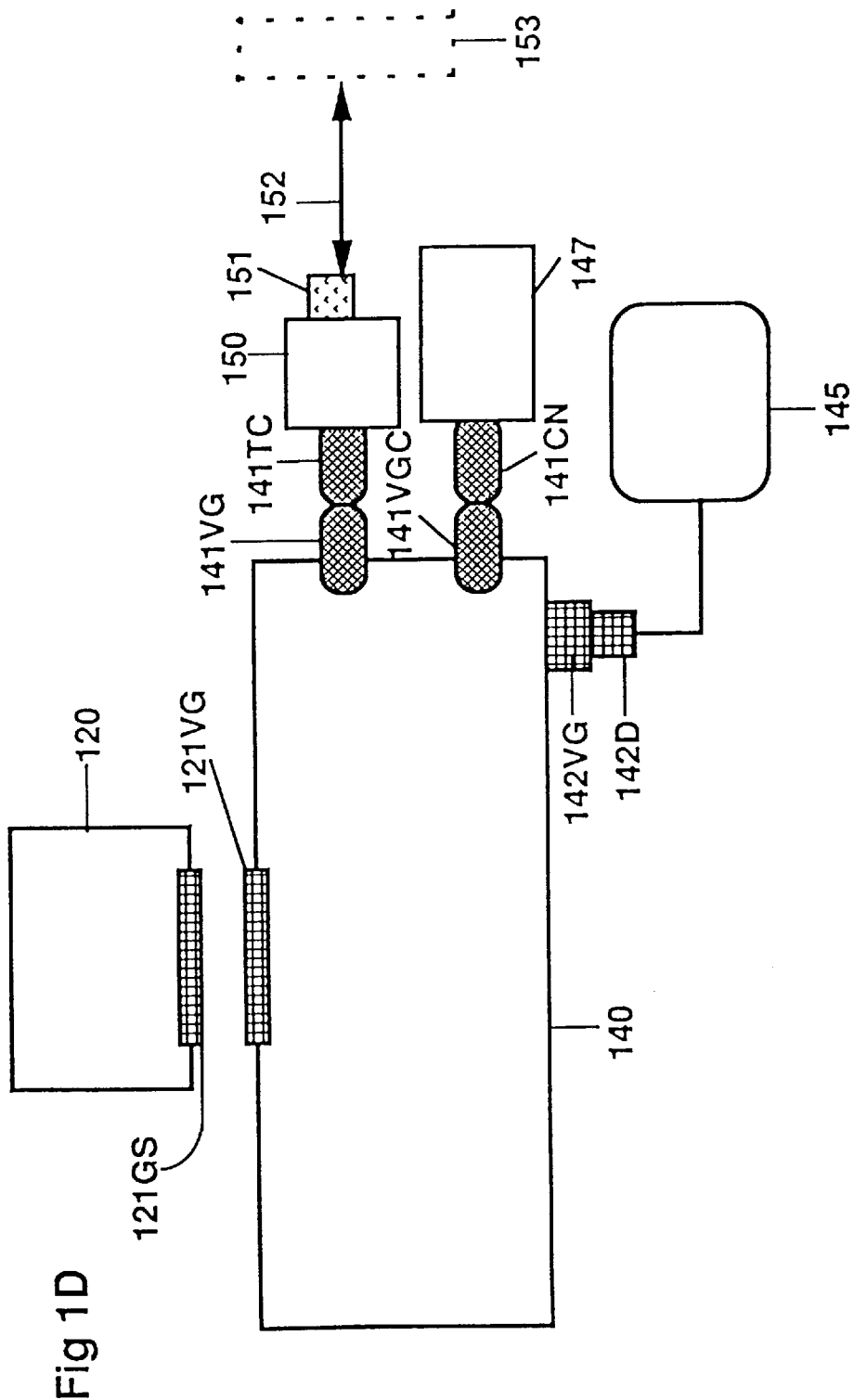
FIG. 1D illustrates a user image adapter interface system providing for the coupling of the user images, as coupled via a communications medium from either an image source or from another video game system in accordance with another aspect of the present invention.

Referring to FIG. 1D, an alternative system of FIG. 1C is provided. Instead of providing an external storage card 130 for coupling to the video game apparatus (via the I/O port or via the game connector bus (either via an interface adapter system or via a Storage Card), the adapter interface system of FIG. 1D provides a telecommunications link 150 that couples via mating connector 151 to an appropriate communications bus or gateway 152, (such as a phone line, modem connection or higher speed protocol). Data is loaded from a remote data source via the telecommunication link 151 to the video game apparatus 140 for storage in memory either in the video game apparatus 140 or on the game cartridge 120.

The memory is read write RAM or EEPROM permitting the user images to be used during the play and display of the video game. Nonvolatile read write memory permits longer term storage of those user visual images in the game card so that they don't need to be reloaded in the future unless changed.

The telecommunication link 150 can be coupled to I/O port connector 141VG via connector 141TC, or can alternatively be coupled to a connector on the game cartridge 120 (as in FIG. 1A in place of the storage card 130), or can be coupled to storage card connector 131AI of the adapter interface system 110 of FIG. 1B. The telecommunication link 150 can be used with the systems of FIGS. 1A–C, as an added feature. A compact disk player and interface or other local storage can alternatively be coupled to the adapter interface system of FIG. 1D, in place of the telecommunication link 150 that couples to a remote data storage source.

In a preferred embodiment, as illustrated in FIG. 1E, for new user image game designs, the game card 120A contains logic 125 to automatically map user visual images into the memory space of the game card 120A. When the Storage Card 130 is connected via connectors 131SC and 131GC to the game card 120, the user images data sets (.IDP files) contained on the Storage Card are mapped into the appropriate memory space of the game cartridge, so as to override the selected or default predefined character images. The game cartridge 120 will play either with or without the Storage Card 130 attached thereto. This is preferably done in a manner transparent to the microprocessor of the video game apparatus, using decode logic in the Storage Card 130 or game cartridge 120A.

Figure 1F:
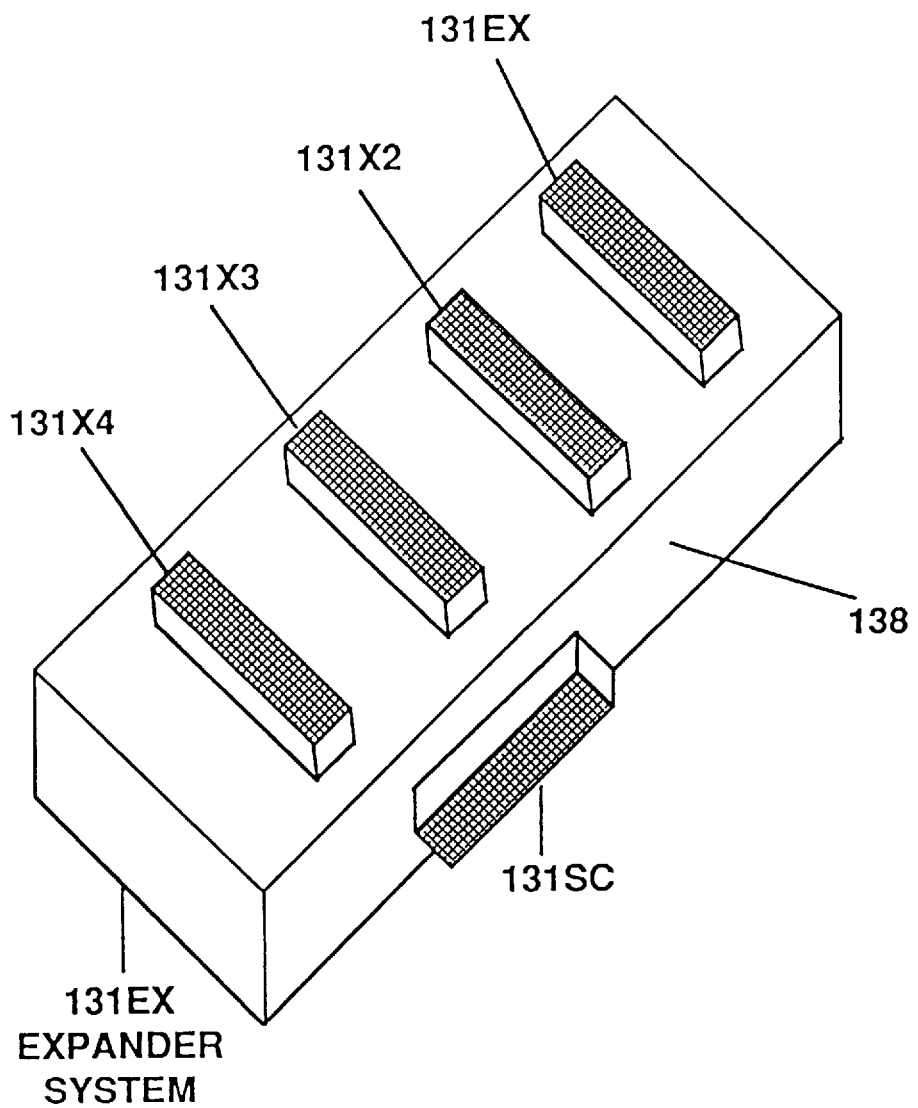
FIG. 1F illustrates an expander system for permitting multiple storage cards to be coupled to a single video game system, in accordance with the present invention.

Referring to FIG. 1F, expander system 131EX permits multiple users to each and all simultaneously couple their individual storage cards 130 to the video game system 140, so as to permit each user to have a respective user image associated with a respective different predefined character image or game display function or audiovisual presentation icon. The storage card connector 131SC is adapted to couple to the storage connector for coupling the storage card into the video game system (e.g., 131GC of FIG. 1A, 131AI of FIG. 1B). Interface and buffer circuitry 138 buffer and expand the connector interface from one to four, and simultaneously couples the storage cards into the video game system. Interface subsystem 138 also provides additional address selection so as to permit the video game system to separately identify and use each of the multiple storage cards and the users images stored thereon.

Multiple storage cards, each with user visual images for a different user, can be coupled to the video game system for use therein. For games where multiple users provide storage cards with user visual images, the connector 131 provides multiple connectors allowing multiple storage cards to be interconnected thereto. The video game system detects those games allowing multiple user visual images therein, for multiple players, and additionally detects when multiple user visual image storage cards are present A memory flag is set indicating multiple user visual image cards are present. This enables multiple sets of tables of pointers for game display function and image data starting address, one set each for each player having a user visual image storage card.

Figure 1G:
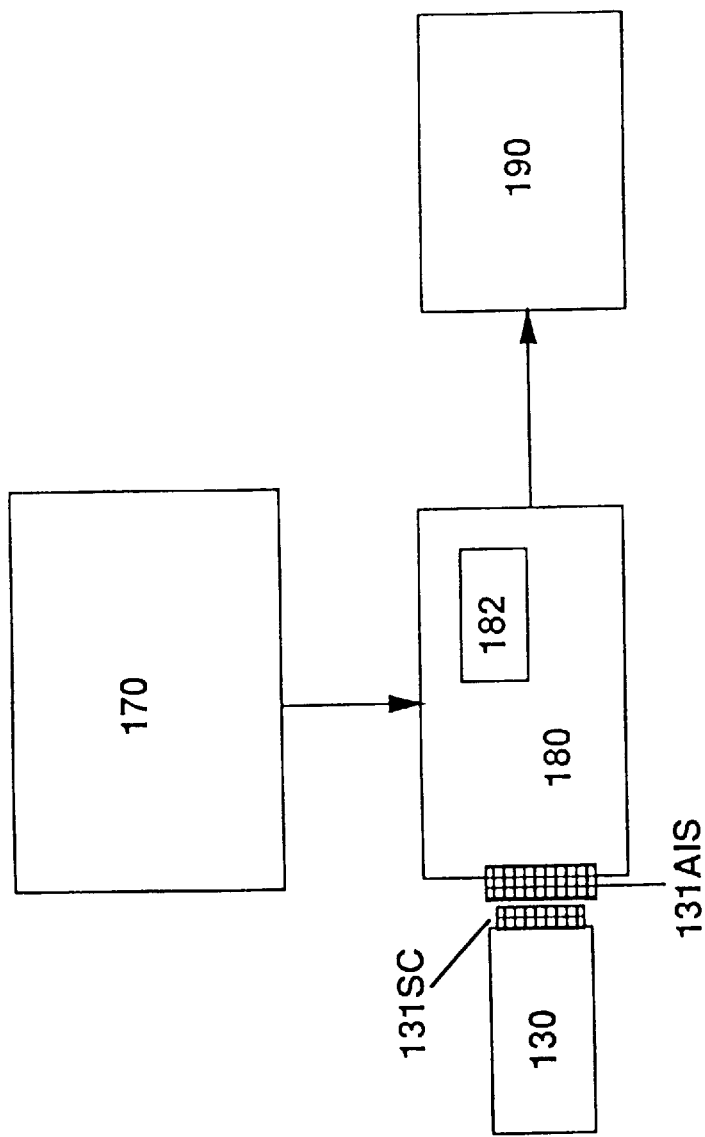
FIG. 1G illustrates a general purpose adapter interface system for use with any audiovisual source, in accordance with the present invention.

Referring to FIG. 1G, audiovisual image source 170 provides an audiovisual presentation output such as video (video cassette player or recorder, cable or broadcast television, laser disk, audiovisual, digital video tape, formatted image data [e.g., PICT]), audio tape or disk, which output is coupled to a display 190. Adapter interface system 180 analyzes the output of the image source 170 and identifies and intercepts selected predefined character images of the audiovisual presentation. A user image is substituted from the storage card 130, coupled via storage card connector 131SC from the storage card 130, to connector 131AIS to the adapter interface system 180, or otherwise modifying the associated presentation, and provides and audiovisual output to drive a presentation display/speaker 190. The adapter interface system 180 is further comprised of video processor 182 that provides digitization, formatting and other processing as necessary to permit analysis of the audiovisual image source 170 output.

In a preferred embodiment, the adapter interface 180 couples black box style to one or more storage cards and to a video monitor and a video source. The adapter interface system 180 can be stand-alone or an attachment coupled to a video game system or a computer system. This permits user image integration into any source of audiovisual presentation.

Figure 2A:
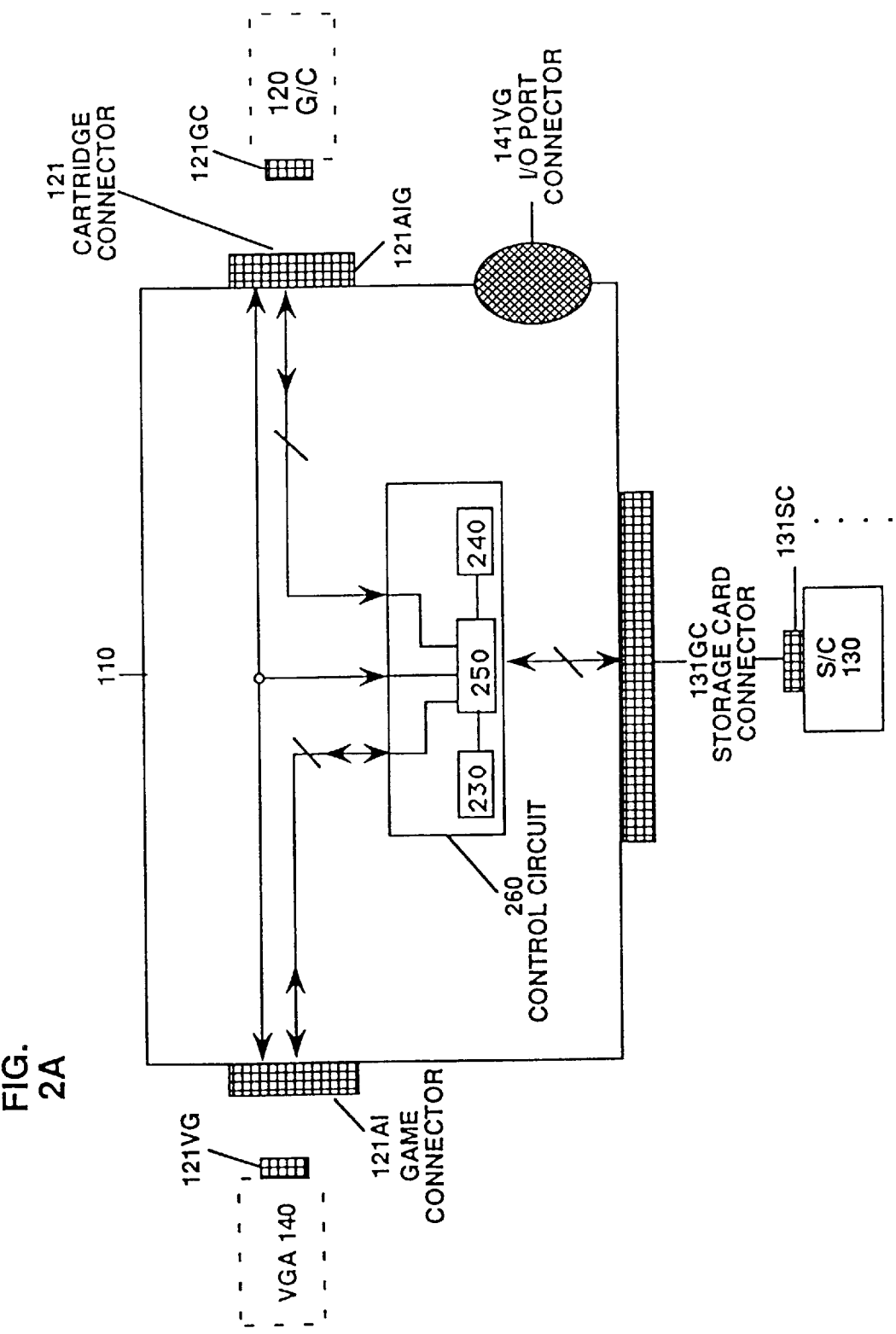
FIG. 2A illustrates the adapter interface system of FIG. 1A in greater detail.

Referring to FIG. 2A, there is illustrated an internal block diagram of an adapter interface system 110 for use with FIG. 1B where video interface 210 and serial interface 220 are not utilized, but otherwise corresponding functionally to FIG. 1A. The game connector 121VG from the video game apparatus 140 is coupled via connector 121AIV to the main control system 260 that provides storage card interface, game card interface and video game apparatus interface responsive to control logic 250 that is responsive to signals from the game connector bus 121, and from the game cartridge 120 and game apparatus 140.

In accordance with the rules and instructions contained in a read only memory 230 and utilizing a read/write memory 240, for a processor-based logic 250 the control system 260 controls all aspects of user image programming and interface. This is accomplished during both an initialization mode and ongoing throughout the game. The control system 260 also controls the coordination of addressing of the game cartridge and storage card and coordination of the utilization of user visual image data as appropriate to provide a video game system having an audiovisual presentation containing the user image.

Figure 2B:
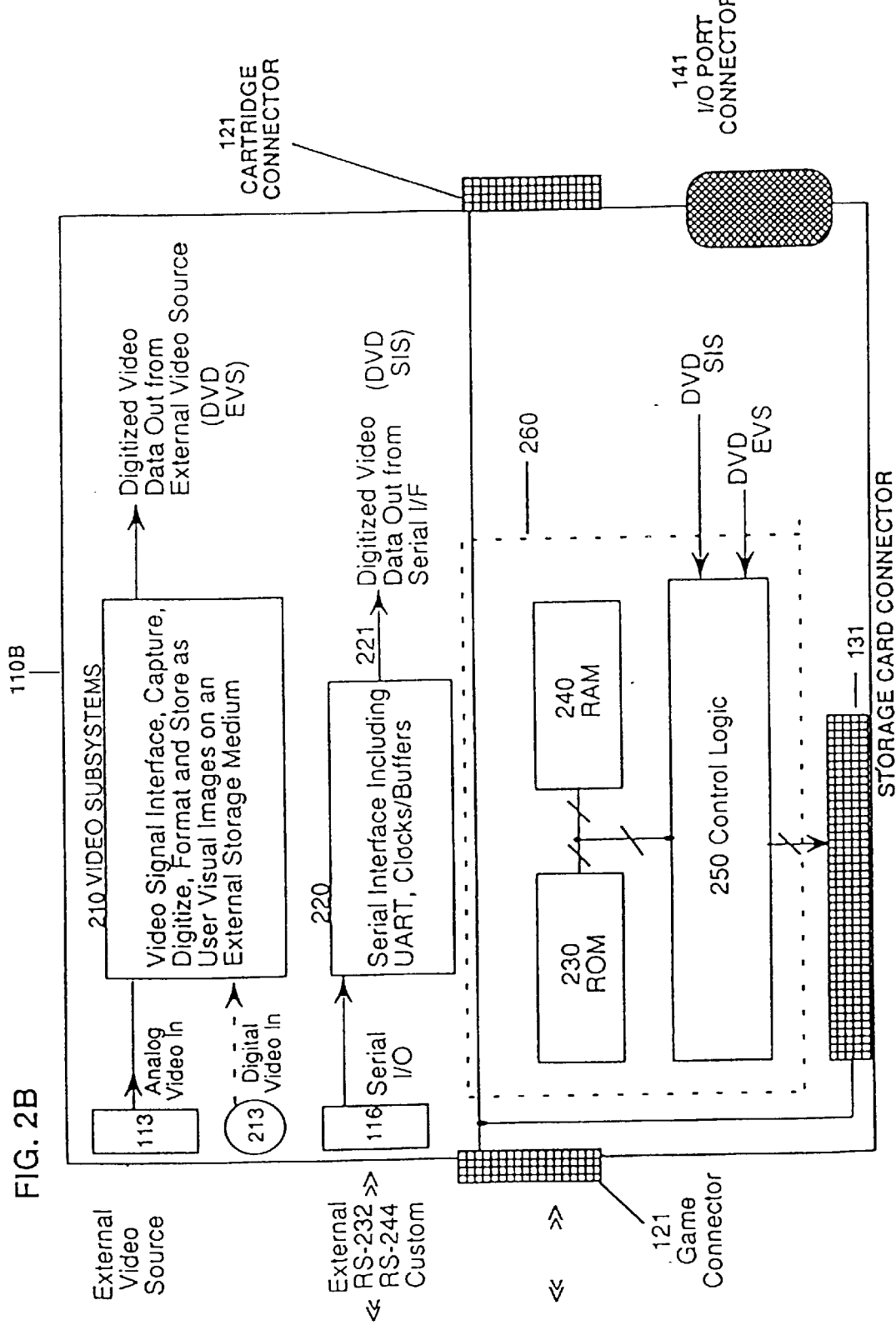
FIG. 2B illustrates the adapter interface system of FIG. 1B in greater detail, illustrating the adapter interface system with a video interface, an interface to the storage card for user image storage, and serial computer interface, adapted for coupling to the video game apparatus, to the image storage card and to the game firmware/software card or cartridge, in accordance with the present invention.

Referring to FIG. 2B, an adapter interface system 110C corresponding to the adapter interface system 110B of FIGS. 1B and 1C is illustrated. The control circuit 260 of FIG. 2A is still present providing functional equivalence. Additionally, the control and coordination of capture and formatting of user visual image data is performed by the adapter interface system 110B of FIG. 2B.

The interface adapter system 110C includes a video subsystem 210 coupled to the video connector 113 for receiving analog video input from an external video source. The video subsystem 210 provides for video signal interface, capture, digitization, and formatting as user visual image data responsive to the controller 260, for storage on an external storage medium via the storage card connector 131. The output from the video subsystem 210 is a digitized video data output converted from the analog video input received from the external video source. Interface connector 213 is provided to allow direct input of digital video input from an external source, whereby the video signal interface capture and digitization of analog signals section of video subsystem 210 is no longer required.

Analog video in and/or digital video in can be coupled to the video subsystem 210, depending on the desired application. However, for cost efficiency and compatibility with most home users, an analog video input is probably adequate, and most cost effective.

The interface system 110 is also comprised of a serial interface subsystem 220 that couples to the serial connector 116 for coupling to external serial interface such as RS232, RS244, etc. Serial interface 220 provides for UART, clocking, buffering, and simple control logic, to provide a digitized video data output 221 from the serial interface 220, that is coupled to the controller 260 for appropriate formatting and storage on an external storage medium of user visual image data.

The controller circuitry 260 is coupled to the game cartridge connectors 121 for coupling to the video game apparatus 140 and separately coupling to the game cartridge 120. Additionally, the controller circuit 260 is coupled to the Storage Card connector and/or optionally the I/O port connector where the storage card is coupled via an interface adapted for coupling via the I/O port connector. Certain signals, such as power signals can be directly coupled from one game connector 121 to the other game connector 121, so as to couple certain signals like power directly from the video game apparatus game connector to the game cartridge game connector. These signals are also coupled to the control circuit 260, for selective coupling to the Storage Card 130 via the storage card connector 131 coupled to the controller circuit 260. Alternatively, where the storage card is coupled via the I/O port, coupling of signals is via the I/O port connector. The remaining signals from the video game apparatus are coupled via the game connector 121 to the controller circuit 260 and are selectively interfaced to and from either the storage card 130 via connectors 131SC and 131AI to the external storage medium 130 or via the cartridge connectors 121AIG and 121GC to the game cartridge 120. The controller circuit 260 provides for coordination of access to the storage card 130 for utilization of user visual image data in accordance with the present invention.

The controller 260, in the intercept embodiment, in addition to those elements as described above with references to FIGS. 2A and 2B, also provides, intercept logic functioning, as discussed elsewhere herein, such that the adapter interface system 110I additionally provides the intercept function, whereby non-user image designed games can be utilized with user visual image data, whereby the adapter interface system 110I selectively substitutes for certain game software character image data with user visual image data for predefined character image data so as to provide a video game including the user visual image in the video presentation thereof. As discussed in greater detail hereinafter, the intercept function analyzes the signals to determine when it's appropriate to make substitutions of user visual image data for predefined game character data.

Figure 3:
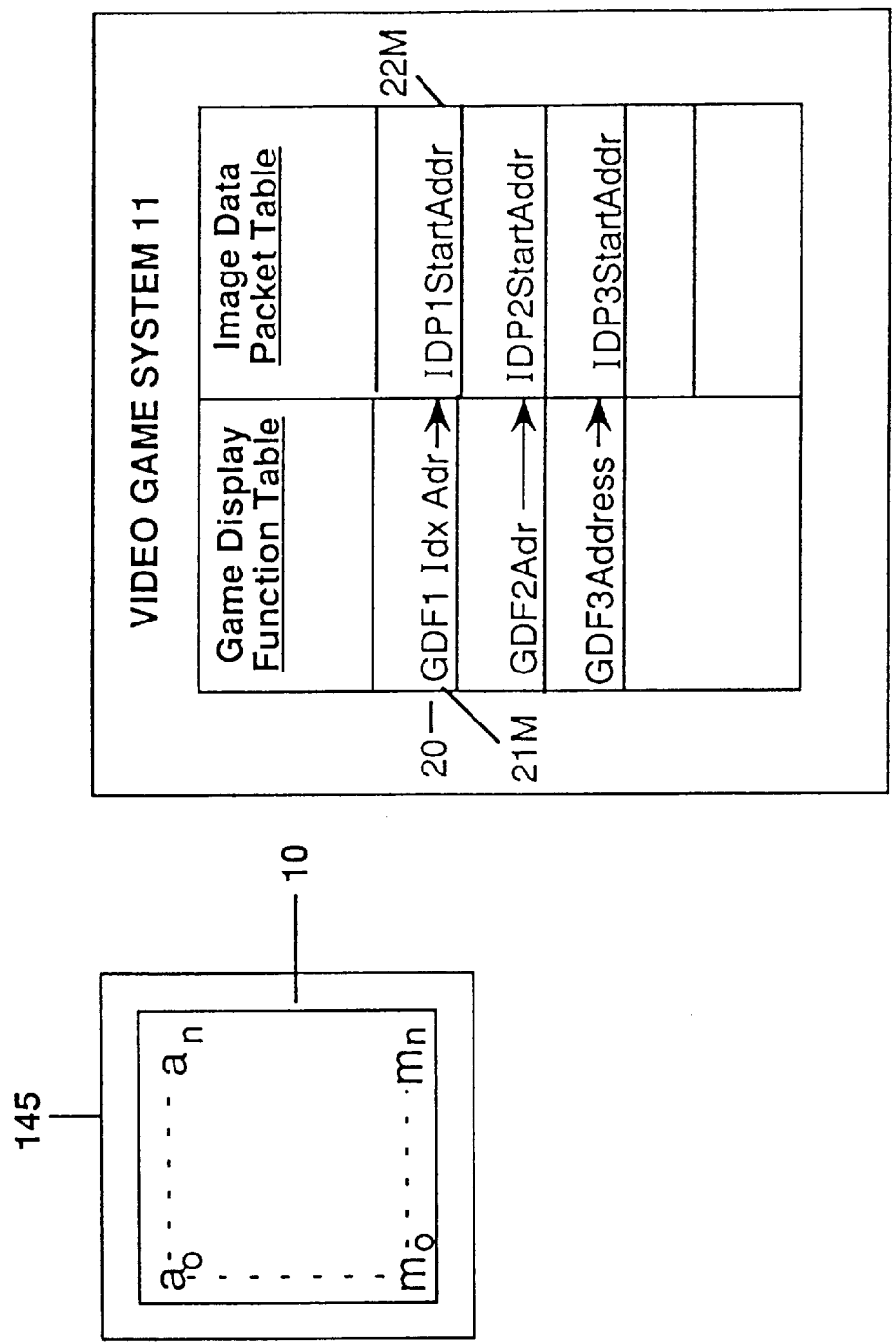
FIG. 3 illustrates a presentation display mapping to logical and physical memory mapping diagram in accordance with the present invention.

FIG. 3 illustrates a presentation display to logical and physical memory mapping diagram in accordance with the present invention.

In accordance with one aspect of the present invention, the user image creation system creates a mappable absolute or virtual link of the user defined images and sounds and related parameters for integration into other graphics and game software packages, such as where the user defined or created visual or audio images or parameters therefor are utilized in the audio-video presentation of the video game as one or more of the preselected character imagery segment(s) or sounds associated with the user's play of the game or as a particular character or other video game or software function in the game (e.g., hero, villain, culprit, etc.) and/or a particular portion and/or perspective view of a particular character, such that one or more of the user visual images and/or sounds is incorporated into the audiovisual presentation of the resulting video game. A virtually mappable link of the user defined images is game independent so that it can be mapped in a relocatable manner to fit into any address space mapping compatible with the video game to which it is being linked. In addition, the virtually mappable link permits adaptation of the user defined image data to any formatting structure for a particular game. Where a class of games is created with a uniform format and mapping, then an absolute mappable link of the user defined image can be utilized with games.

Most video games are designed with character-based video presentation display such as display 10 on monitor 145, comprised of multiple rows (a to m) of multiple characters ($a_o$ to $a_n$, to, $m_o$ to $m_n$) each. (For example, the Sega Genesis utilizes 28 rows of 40 characters each, where each character is 8×8 pixels.) A predefined character image is a graphic that is comprised of one or more characters that are associated with a video game display function.

For example, a predefined character image may be comprised of display characters $a_o$ to $a_c$, $b_0$ to $b_c$, and $c_0$ to $c_1$, that are associated with a game display function present in the audiovisual presentation 10. A Game Display Function index table in memory 20 indexes (addressed by the game display function) to Image Data Packet Index Table memory 30 that contains corresponding information comprising the proper memory starting address pointer. Mapping data can relatively define the image characters or can define the relative position of the predefined character image. Memory 20 either within the video system 11, can be distributed physically as desired, preferably within VGA110 or Storage Card 130, or both.

FIG. 3 illustrates an alternative correlation and mapping of multiple Game Display Functions ("GDF"), as discussed with reference to Tables II and III.

When a selected GDF is requested from the Game Card 120 by the VGN140, the AIS110 intercepts the request and accesses the GDF Table 21M. Each GDF number (e.g., GDF #1, GDF #2) has a memory location serving as a pointer to an entry address for an associated User Image .IDP in the .IDP Pointer Table 22M (e.g., IDP#1, IDP#2). The Pointer Tables 21M and 22M need not be physically or logically contiguous, and can both be in the same physical memory 20 or can be physically distributed in separate physical memories.

The .IDP Table 22M entry address is a pointer to the ADDRØØ for the respective User Image .IDP file.

The video game software provides a default set of initialization values for the Table of Pointers by Game Function and in the Table of Pointers to Image Data Packets.

When a storage card containing a user image is present in the video game system, then the video game system updates the video game tables of pointers, (wherever distributed physically [e.g., utilizing the game card memory, the storage card memory, the adapter interface memory or the video game apparatus memory]), either automatically or by user selection process, to identify and associate user image data with a predefined game character or game display function, providing a pointer to the storage card address where the respective user image and/or parameter data storage begins. In a preferred embodiment, if the storage card is coupled to the video game system at power-up or on restart, the storage card loads its set of initialization values into the Tables for Game Display Function Pointer and Image Data Packet Pointer.

A predefined protocol for image data packets (e.g., starting address, size of packet, then number of bytes of image data, number of bytes of mapping data, scaling factor, etc.) permits variable size images. User images can be mapped to a unique exclusive address space (reserved), so that the video game system addresses selected active user visual images for the respective desired game display function.

Alternatively, selected active user images can be mapped to a coincidental address space to supersede (and replace) respective image data for respective game display functions, in a manner similar to shadow RAM superseding and replacing its associated ROM address space.

The pointer table memory can be contained within the storage card, video game apparatus or game cartridge. The game cartridge's having this memory would add a recurring expense for every user visual image class of game cartridge, whereas the other approaches result in a one-time fixed cost, making them preferable at the present.

However, as technology costs go down, EEPROM (and other) technology for game cartridge memory may make it desirable to place the pointer table memory in the game cartridge. Alternatively, image memory can be provided in the storage card 130, game card 120, or within the video game apparatus 140. This image memory is filled such as upon game initialization, with either the default predefined character images or with the associated user image.

Where there are multiple planes of graphics utilized in constructing the video and audiovisual presentation, such as sprite planes, the user visual image can be utilized in constructing sprite planes. Sprites are well known and utilized in the video game field, including in the aforementioned example of the Sega Genesis, and many other video games and early home computers. For example, Texas Instruments, Inc. has a part, TMS9918 sprite graphic chip, and there are numerous sprite graphic and plane layered graphic chips available that could be utilized in conjunction with commercially available computing systems ranging from microprocessors to computers (personal to large).

In accordance with another aspect of the present invention, the user visual image is constructed of signal parameter information regarding synthesizing or modifying either or both of the video or audio signal, that is then utilized to adapt the predefined character image or audio sound track associated with interactive video game display presentation and game play, such that user visual image data can consist of one or more of video image information, audio information, or signal parameter data relating to either video or audio or other control of signals or data, such that the actual integration of the user image into the video game can affect or be affected by one or more of backgrounds, environment, facial feature combination or modification of predefined and user visual image data, user voice data, special graphics and audio data, etc.

It is to be understood that user visual image data is not restricted to video data alone, nor to user provided data alone in the sense that the user can obtain graphics and image data from third party suppliers, including the manufacturer of the particular game cartridge and/or of the video game apparatus. However, any person or system can provide the storage card and couple the storage card to the video game system to effect the user visual image in video game.

As mentioned elsewhere herein, technology from virtual reality can be integrated into the present invention very well, in many ways. For example, there are three dimensional input apparatus and display and modeling hardware and software that permit user movement, from hand movement to facial movement, to be accurately tracked and input as coordinate parameter data in a multidimensional version of a joystick. Furthermore, technologies exist to permit scanned movement and even physiologically based input of image data, such as by x-ray, infrared, sonar, audio, ultrasonic, etc. For example, it is a user of a video game can totally interact with and control input to the video game via non-invasive biological signal monitoring ranging from measuring a characteristic of skin impedance (e.g., resistance capacitance) to brain wave, heartbeat, body temperature, etc. Thus, a user can utilize biofeedback to control pulse rate to keep energy levels higher in the video game. The higher the user's pulse rate, the faster the user burns energy and the faster the user must regain energy by earning it or finding it within the context of the video game rules.

Additionally, inputting user voice data (ranging from predefined spoken words contained on the user storage card to user voice signal parameter data for use by a speech synthesizer) for association to user's visual image data based to interject the user's voice into the video game. Methods of integrating user audio images into the presentation include simple direct feedback, such as when the user pushes a button and fires a weapon, a confirmation report is spoken in the user's voice such as "photon torpedo fired" or "blue squadron launched".

A particular predefined character image within the video game presentation can, when speaking, utilize the voice signal parameter data to model a voice synthesizer in accordance with the user visual image data voice sound parameter data This integrates the user's voice into the audio portion of the presentation associated with the predefined character image. Thus, for this example, the predefined character image speaks so as to sound like the user. Instead of sounding like the user, the voice signal parameter data can be for any other voice, or modification of the user's or other voice or other sound or a combination thereof. This enables the use of famous voices (under appropriate license), or other voices or sounds in place of the predefined character default voice associated with the video game software contained on the game card (as the system would operate if no storage card were installed).

Figure 4A:
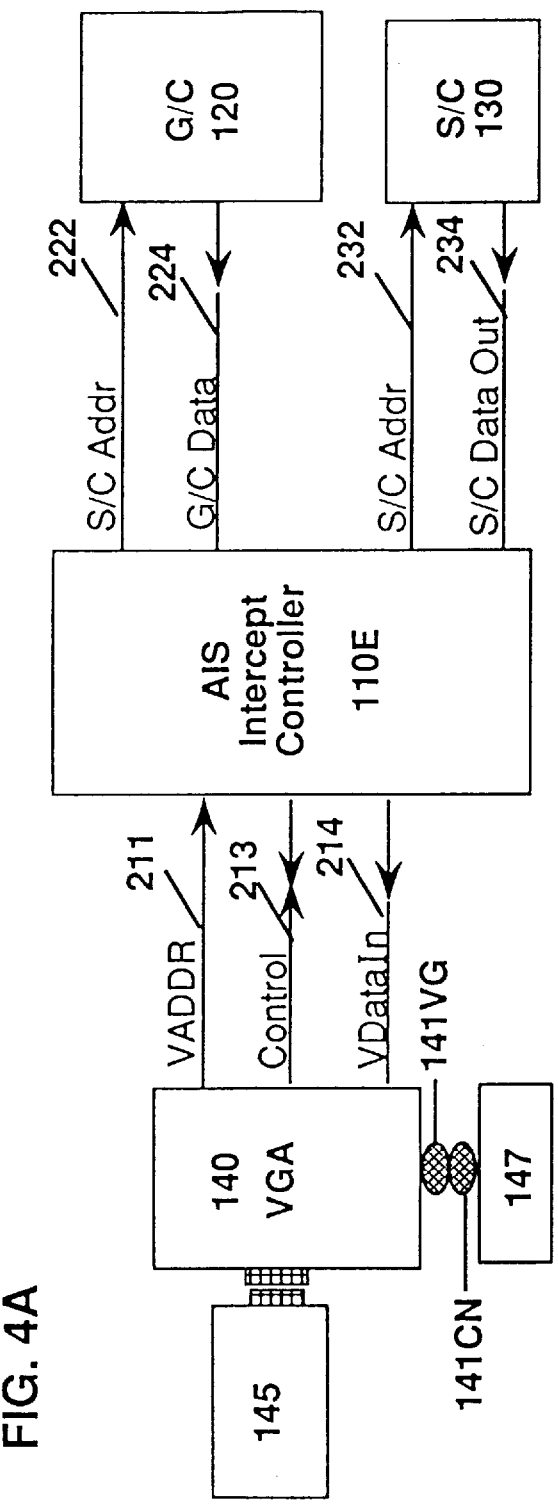
FIG. 4A illustrates the block diagram and data logic flow diagram of an Adapter Interface System such as in FIGS. 2A and 2B, with the addition of an Intercept Controller system, in accordance with the present invention.

FIG. 4A illustrates the block diagram and data logic flow diagram of the Intercept Adapter Interface System compatible for use within the Adapter Interface System of FIGS. 2A and 2B, in accordance with the present invention. An intercept controller embodiment of an adapter interface system 110E is coupled to a game cartridge 120 Storage Card (S/C) 130, and a video game apparatus 140. The video game apparatus is coupled to an external display monitor 145 and to user controls 147. The intercept controller adapter interface system 110E receives address signals 211 and control signals 213 from the video game apparatus 140 and selectively couples these signals to the game cartridge 120 and Storage Card 130 via respective Game Card address and control signals 222 and Storage Card address and control signals 232. The Game Cartridge 120 or Storage Card 130 responds to the respective address and control signals to provide either game card image data out 224 or Storage Card image data out 234 for coupling to the intercept controller adapter interface system 110E that provides a "video game data in" output 214 for coupling to the video game apparatus 140.

Figure 4B:
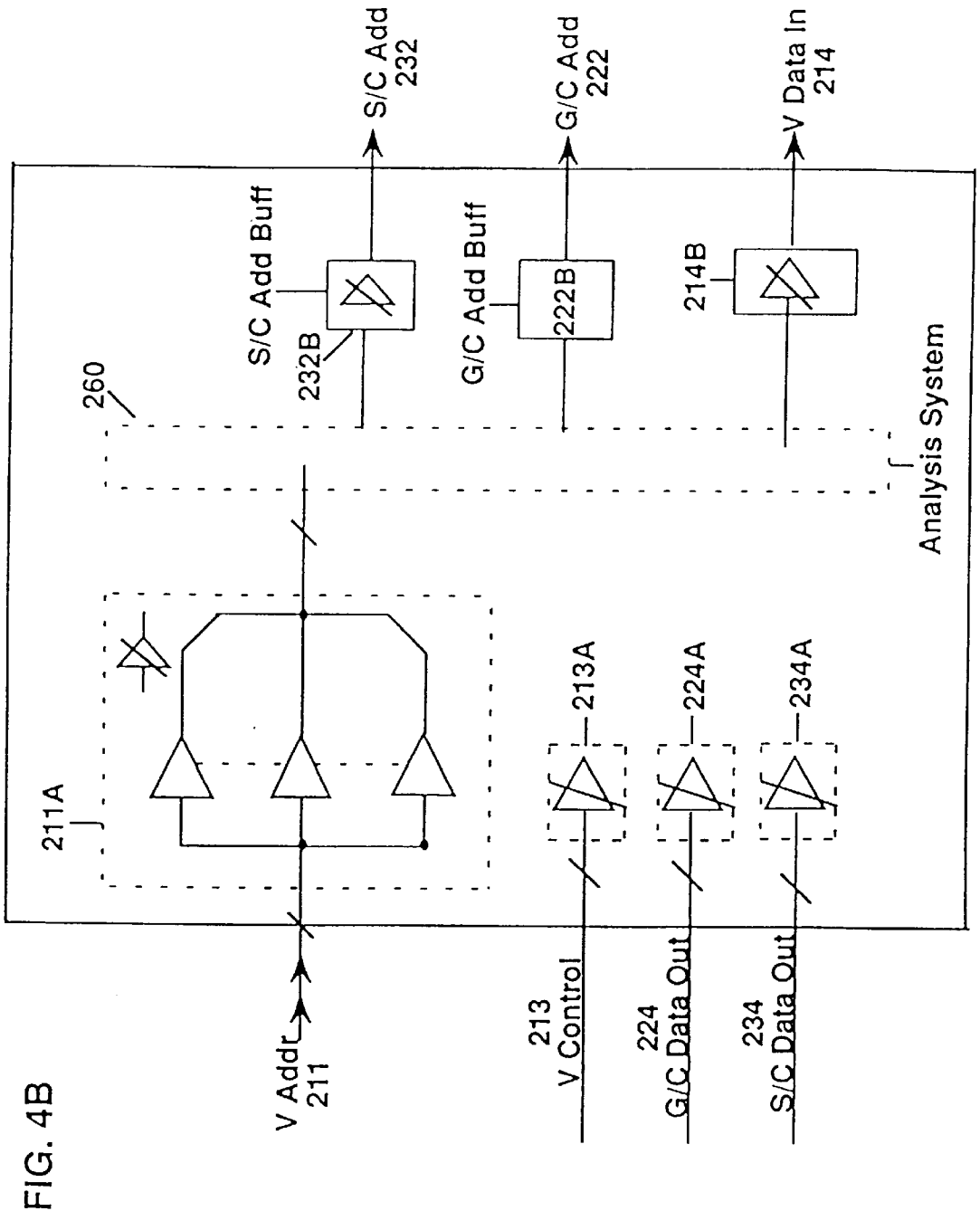
FIG. 4B is a detailed block diagram of the adapter interface system of FIG. 3A.

FIG. 4B shows a more detailed block diagram of the intercept controller adapter interface system 110. This system 110 is comprised of input buffers 211A, 213A, 224A, and 234A that respectively buffer the video game address signals 211, video game control signals 213, the game cartridge data out signals 224, and the Storage Card data output signals 234. The output signals 234 couple the respective signals to the analysis system 260 of the intercept controller adapter interface system 110E. This system 110E selectively provides address output 222 to the Game Card 120 and address output 232 to the Storage Card 130 for output to the game cartridge 120 or Storage Card 130. The output is in response to the analysis system 260 determination and selection of proper address output.

The Storage Card address buffers 232B couple the Storage Card address signals 232 to the Storage Card 130. The Game Card address buffers 222B couple the Game Card address signals 222 to the Game Card 120, as selectively determined and controlled by the analysis system 260. The Game Card 120, as appropriate, responds by providing predefined character Game Card image data output 224 to the Analysis System 260. The Storage Card 130 responds, as appropriate, by providing User Image Storage Card data output 234 to the Analysis System 260.

The output buffer 214B selectively couples data as provided by the analysis system 260 to the video game data in signals 214 to the video game apparatus, responsive to a determination and analysis by the analysis system 260 as to whether the Game Card data out signal 224 or the Storage Card data out signal 234 is the proper signal for coupling to the video game apparatus as the data input Video Game Image input 214 coupled to video game apparatus 140.

The analysis system 260, in conjunction with the remainder of the intercept controller adapter interface system 110E, provides for substitution of the user's image for the predefined game character image in a manner transparent to the original video game apparatus and the original game cartridge. Thus, existing video game hardware and game cartridges can be reused to expand the horizons of possibilities of modifications and play of the games. Updates can be provided with new predefined graphics provided by the manufacturer of the game apparatus and software via a Storage Card. Sets of "canned" user visual and audio images can be provided by third parties (via the Storage Card).

There are numerous ways to implement the analysis system 260. For example, address and/or control and/or data signal analysis, timing analysis, state analysis, signature analysis, or other transform or analysis techniques can be utilized to identify when particular predefined player graphic character segments are being accessed and transferred to the video game apparatus 140 read/write memory from the game card 120, and at the appropriate time, instead of accessing the Storage Card 130 and transferring data out 234 from the Storage Card via the intercept controller 110 for coupling via the video game data signals in 214 to the video game apparatus 140. The substitution of user visual images is preferably automatic upon detection of Storage Card 130 being installed in the system, but can also be manually activated. For newer game cartridges designed with a link feature, the user can actually make selections and set up control when the Storage Card 130 is installed, via the user controls 147.

In a preferred embodiment, for each game, it is possible to provide a mapped set of addresses associated with image data for predefined character image segments for that game, and to store those addresses as a table in memory, preferably within the Storage Card 130 or in memory in the adapter interface system 110 or in the video game apparatus 140. The look up table function can be provided utilizing ROM, RAM, EEPROM, PLA, EEPROM or through discrete logic. The addition of a finite state machine, microcomputer, or digital signal processor permits the addition of many functions, and can provide intelligent initialization and start up. However, in the simplest mode, where only decode is needed, the processor from the video game apparatus 40 can be utilized by the adapter interface system intercept controller 110. Alternatively, a separate Storage Card could be provided that contained the mapped set for one or more particular game cartridges, and then a Storage Card 130 containing user visual images could be inserted upon prompting via the display monitor 45. Where it is not possible to obtain mapped set address information from review of the software listing, or from the game designer, it is also possible with analysis techniques to determine a signature analysis technique based on the control signals and/or the video address signals output from the video game apparatus 40 and/or the game card data out signals output from the game card 120.

In conjunction with another aspect of the present invention, the intercept controller contains a storage table containing the necessary signatures needed to perform the signature analysis for address and/or data flow analysis, state analysis and/or timing analysis or a combination of those and/or other techniques. These techniques are accessed by an initialization program for the video game apparatus that either automatically identifies or that allows the user to identify, via the user control 147 and the display monitor 145, which game cartridge game software package is being utilized.

The intercept controller 110 is then properly initialized, from its stored table of signatures, to appropriately intercept certain predefined character imagery segment access requests by the video game apparatus. The intercept controller 110 substitutes the user images from the Storage Card 130 into the video game apparatus 140 data so that a video game presentation displayed on monitor 145 by the video game 140 is responsive to the user controls 147. The video game is also responsive to the rules and instructions contained in the Game Card 120 software cartridge and to the user visual images integrated in from the Storage Card 130.

Analysis means 260 recognizes those signatures of the selected certain predefined character images, and provides certain signals (e.g., address and control signals) to obtain a user visual image. Obviously, when the Game Card 120 is addressed and accessed, then the game cartridge data 224 is coupled via the controller 110 to the video game apparatus 40 for use therein, for non-user visual images' associated addresses.

The method in accordance with the present invention of utilizing user image data in the audiovisual presentation of the video game, is also extendible and applicable to any digitized audiovisual presentation. The method provides for analysis identification of a predefined image character within the presentation by analysis of signals associated therewith, and association of the predefined image with a user image such that the user image is integrated into the presentation in place of the selected predefined image.

Thus, the Intercept Adapter Interface System ("IAIS") of the present invention is valuable in applications that extend beyond computer based video games to include User Image integration into any digitized or computer generated video or animation presentation. Examples include (1) interactive cartoons at home (e.g., IAIS is coupled to the home VCR and TV); (2) interactive animations or digitized video (live or recorded), or multiple use entertainment systems (e.g., such as visitors to Disneyland receiving a User Image Storage Card at entry).

The Storage Card is used at each exhibition or attraction. As the user goes through the exhibit, he/she inserts his/her card into a connector and thereafter "participates" in the display presentation; (3) a service bureau could permit "you" to star in your own movie by integrating in "your User Image," and mailing the integrated movie back to "you." The multiple use entertainment (e.g., amusement park) aspects of the present invention will subsequently be discussed in greater detail.

Figure 4C:
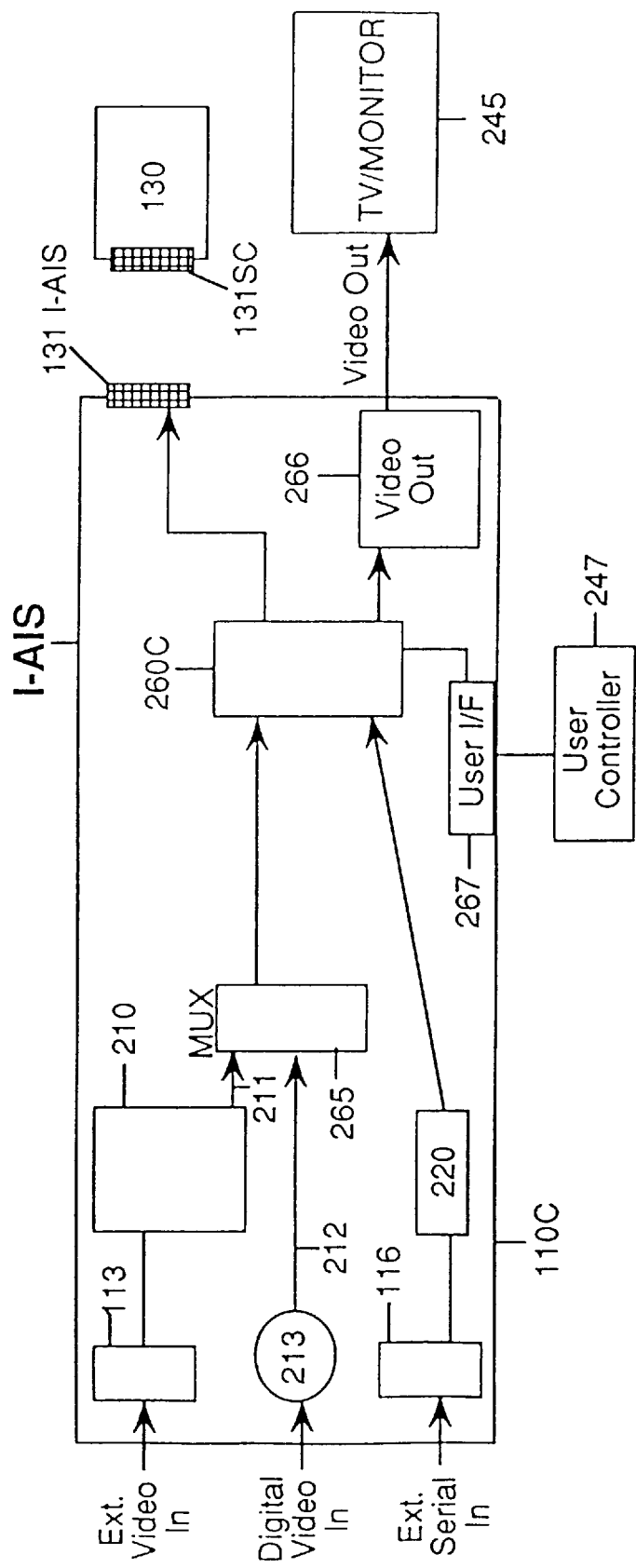
FIG. 4D is a flow diagram of the intercept function of the adapter interface system 110E of FIG. 4A.
FIG. 4 c illustrates an intercept adapter interface system having subsystem componentsm wherein the control circuit provides functional equivalence to the control circuit and additionally controls and coordinates the capture and formatting of user image data.

Referring to FIG. 4C, an intercept adapter interface system 110C, having subsystem components (113, 210, 213, 116, and 220) is illustrated, wherein the control circuit 260C provides functional equivalence, to control circuit 260 and additionally controls and coordinates the capture and formatting of user image data. The interface adapter system 110C includes a video subsystem 210 coupled to the video connector 113 for receiving analog video input from an external video source.

The video subsystem 210 provides for video signal interface, capture, digitization, and formatting as user visual image data responsive to the controller 260C, for storage on an external storage medium via the storage card connector 131. The output from the video subsystem 210 is a digitized video data output 211 converted from the analog video input received from the external video source that is coupled to multiplexer 265 that has its output coupled to controller 260.

Interface connector 213 is coupled to allow direct input of digital video input 212 from an external source that is coupled to multiplexer 265 that has its output coupled to controller 260. Analog video in and/or digital video in can be coupled to the subsystem 110C, depending on the desired application. However, for cost efficiency and compatibility with most home users, an analog video input is probably adequate, and most cost effective.

The interface system 110C is also comprised of a serial interface subsystem 220 that couples to the serial connector 116 for coupling to external serial interface such as RS232, RS244, etc. Serial interface 220 provides for UART, clocking, buffering, and simple control logic, to provide a digitized video data output 221 from the serial interface 220, that is coupled to the controller 260C for appropriate formatting and storage on an external storage medium of user image data.

Controller circuit 260C is coupled to the Storage Card 130 via connectors 131I-AIS and 131SC and to the user interface 267 is coupled to a user controller 247 providing signals responsive to user activated input stimulus.

The controller 260C also provides intercept logic functioning as discussed elsewhere herein such that the adapter interface system 110C additionally provides the intercept function, whereby the adapter interface system 110C selectively substitutes user image data for predefined character image data so as to provide an audiovisual presentation that includes the image integrated therein. The intercept function analyzes the signals to determine when it's appropriate to make substitutions of user image data for predefined game character data.

For video game systems, the analysis of the digitized presentation data and transformation into a user visual image modified presentation must be performed in near real-time or real-time, such that the user selected image is tracked and the associated user image is substituted therefor or otherwise utilized. If suddenly a large displacement occurs the display of the entire display presentation is scanned to detect the selected image. Small displacements are tracked and predicted by extrapolation and history.

For video graphics signal (e.g., movies, animation, etc.), that have been digitized, the analysis and transformation can be performed in less than realtime (such as processing of an animation to include user images in addition to or in place of preexisting defined characters). If more user images to be integrated are provided than normal predefined image characters that can be associated therewith exist, the system is capable of creating "extras" (in the acting sense) of additional predefined character images. This permits large numbers of user images to be incorporated into the display presentation of the processed video.

Thus, animations, such as cartoons and movies, can be user visual image and/or sound image integrated in accordance with the teachings of the present invention. This is accomplished in a manner that is transparent to the original source of the video display presentation.

Technology exists today to do this, although the cost of existing systems at the present is still expensive relative to the cost of a home video game system. However, for amusement parks, arcades, circuses, movie companies, etc., the technology is within the budget of an affordable and profitable project. It is anticipated that in the near future, the cost of the technology will be greatly reduced down to the cost where a block adapter box can be hooked between the television and the video source, and in conjunction with a home video game system or a personal computer, or an adapter interface box controller, the user can provide user visual image integration into any audio-video presentation.

Broadcast programming and prerecorded programs can be modified, either delayed for processing or processed on the fly as output, to provide an audiovisual presentation. In this case, the user image data is integrated and forms a part of the audio-video presentation as, or associated with, a predefined character image.

Examples of technology utilized today that is adaptable and has equivalents available for application to the present invention include the technology used in colorizing movies and cartoons for the movie film industry, and the technology of digital editing suites used by Video Production studios and services. Examples of Video Production Studio equipment include those from Grass Valley that makes switchers, Ultimatte, video distribution amplifier and Video Digital Video Disk Recorder, as well as technology for Texture Wrapping by a "Deviation" product by Pinnacle, Inc., in Ill. Additionally, many currently available video processing boards (including such boards as those from the following U.S companies: Raster Ops, Intelligent Resources Integrated Systems, Inc. [IRIS], TrueVision, Nutek, GrassValley, Tektronix, Hewlett Packard, IBM, etc.), can be adapted and utilized, or their equivalents, to provide the necessary technology to implement this aspect of the present invention.

The integration of the user created image data into the video game system architecture can be structured in a number of ways. Referring to FIG. 4D, a flow diagram of the intercept function of the adapter interface system 110E of FIG. 4A is illustrated. In the preferred embodiment illustrated relative to FIG. 4D, the user visual image data is integrated into the video game (Step 905:) upon initialization (e.g., restart or power-up) (Step 910:), by the video game apparatus 140 analyzing the video game software from Game Card 120 that provides a key as to its identity, that is utilized by the video game apparatus processor to permit the loading of a mapping table within the adapter interface system 110 (or Game Card 120 or Storage Card 130) so as to permit direct interception and substitution of predefined character images with user visual image addresses with corresponding user visual images.

The game cartridge 120 can also be provided with the capability to deselect itself for addresses that have been enabled on the Storage Card 130 for other embodiments. Alternatively, the game image data can be stored in the video game apparatus 140, and user visual image data can simply overwrite the corresponding predefined game character data that it is to replace.

Once (Step 915:) the video game begins, and (Step 920:) the Adapter Interface System 110 analyzes signals from the VGA140 meant to address the game card 120. (Step 930:) A decision is made as to whether the address request to the Game Card 120 is one of those associated with a predefined character image from the Mapping Table Data as stored in the memory of AIS110 so as to require a substitution. Step 940: If a substitution is to be made, then the AIS110 accesses the mapping table and outputs a substitute address to the storage card 130, coordinating complete transfer control of all address and data transfers needed to substitute the user image data for the predefined character image data.

(Step 945:) If no substitution is to be made, then the address from VGA140 associated with the predefined character image is coupled to the game card 120 from the adapter interface system AIS110.

(Step 950:) After an address is output to the storage card 130 (Step 940) or output to the game card 120 (Step 945), the next step (Step 950) is the wait for the next address output from the VGA140 to the game card 120 associated with a predefined character image from the mapping table data as stored in the memory of AIS110.

(Step 960:) A decision is made by the AIS110 as to whether the next address is one that is associated with the predefined character image to be associated with the user image. If so, indicated yes in FIG. 4D, the process continues by branching back (to Step 920:). If the next address is not one associated with the predefined character image from the mapping table, indicated no, then the process continues by branching to Step 950. Thus, FIG. 4D illustrates a preferred embodiment for the methodology for performing user image integration into the video game's audiovisual presentation in accordance with the present invention.

In the preferred embodiment, the user visual image data is mapped into a unique physical address space than that used by the video game software from the Game Card 120 and the system software from VGA140. The unique predefined address space is otherwise unused by the video game apparatus or the game cartridge software, such that user visual images can be directly addressed by the system. Alternatively, specific designated or fixed address space can be associated with a given Game Display Function or predefined character image. Then, as part of an initialization, or a selection routine, the video game apparatus 140 can selectively access the Storage Card 130 instead of the game cartridge 120 by setting up a table in the video game apparatus RAM that permits it to directly address the storage card 130 memory instead of the game cartridge 120 memory, eliminating the need to intercept at all, as to those Game Display Functions or predefined character images represented in the Table.

By knowing the mapping of certain predefined game character image segments for each respective video game, and combining this with a knowledge of the mapping of the user visual images on the Storage Card 130, the intercept controller 110 analysis system 260 directs the substitution of user visual image data for predefined game character image segments.

In accordance with yet another aspect of the present invention, the video game can be made more personal and exciting by utilizing actual video imagery created responsive to user inputs at the individual game apparatus. This aspect of the invention can be utilized in either a stand alone video game, or can be utilized in a multi-user game, either distributed or centrally controlled.

Audio presentation can likewise by associatively integrated into the audiovisual presentation using actual sounds, sound parameters and synthesis or samplers, etc.

Figure 5A:
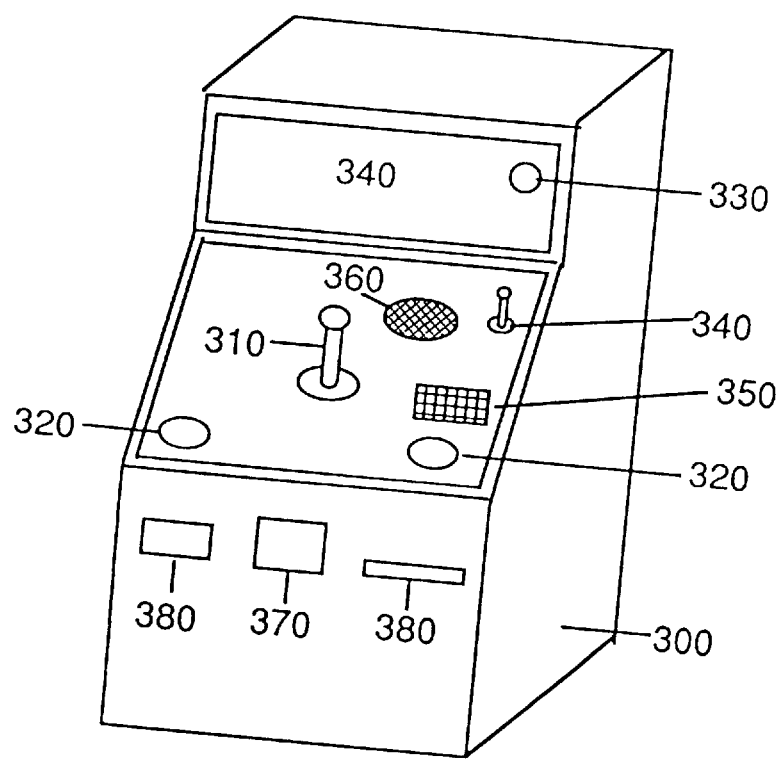
FIGS.5A–B illustrate various embodiments of an apparatus by which users can input, store, and obtain a removable storage card medium containing user images, in accordance with the present invention.

Referring to FIG. 5A, a video game console is shown that can function as (1) a stand alone video game, (2) an individual user apparatus for coupling to a multi-user game system as described elsewhere herein, and as taught in U.S. Pat. No. 4,572,509, by the present inventor, and/or (3) a system for the user to create user visual images and to output the user visual image ("UVI") data for storage on a removable nonvolatile storage medium, and (4) optionally to demonstrate an attract mode for UVI games using the stored images. The structure, electronically and logically, of the video game system 300 is shown in FIG. 5A. The video game system 300 includes a processor 302, memory 303, I/O 304, and video output 305 subsystems, and can be a personal computer (e.g., Macintosh or IBM-PC compatible) based or video game vendor based hardware and software. The video game system 300 has a video image input means, 330 (e.g., video camera, VCR, scanner, etc.) that provides the necessary hardware to input and digitize, process, format, and store a visual image of the user or an image provided by the user. This mode may be selected either by the switch 340 or by input from the keyboard 350 and positioning of the video image input means 330 can be controlled via means of the joy stick 310 with the video image output being displayed on the display screen 340 to provide visual feedback to the user of the individual game apparatus of the image being digitized. When the desired image has been digitized and fed back for display to the user, the user can provide an input stimulus, either from the keyboard 350 or via either of push buttons 320 or via voice recognition, via speaker/microphone 360, or via the switch 340, to cause the storage in the memory of the apparatus 300 of the user visual image data of the user. Alternatively or additionally, the individual game apparatus 300 has the necessary visual recognition processing intelligence to automatically scan the video image input source 330 (e.g., video camera) across the user and select a video image for storage. The system can also differentiate the subject from the background. Alternatively, the user can create images using the video input image means 330 and/or the inputs of the keyboard 350, joy stick 310, switch 340, etc., that can then be selectively associated with one of a plurality of predetermined imagery identifier segments, to create an audiovisual display.

The user created visual display, either of the user or of the user created visual imagery, can then represent that user or any predefined character in the video game audiovisual presentation, either for a stand-alone game, or for a multi-user video game. Thus, for example, the user can create his or her own spacecraft, race car, hero, villain, weapon, monster, or other preselected character functions (e.g., sub-image identifier segments) that can then be incorporated into the overall video game audiovisual presentation in combination with a predefined set of complimentary audiovisual imagery segments according to a predefined set of game rules.

The video image input means 330 can be comprised of one or more of numerous commercially available imaging systems. Solid state (e.g., charge couple device video sensors) or video-tube based camera imaging systems, or other technology as applicable, can be utilized in accordance with this aspect of the present invention. Various lens and focusing arrangements can be utilized, including user controlled, or automatically controlled positioning, focusing and exposure systems. Zoom, crop, etc. features can be provided for use in conjunction with the present invention.

Additionally, or alternatively, other means of user image input can be provided, such as an optional document scanner 380 into which the user feeds a document (e.g., photograph, etc.) for scanning, digitization and storage in the manner as described above for the video image input.

A Storage Card interface 380 is adapted for the user to connect to a Storage Card 130 for storage of User Visual Image data (and other data as appropriate) for removal by the user to later connect to a Storage Card interface on either a video game apparatus 300 or on an adapter interface system 110.

Figure 5B:
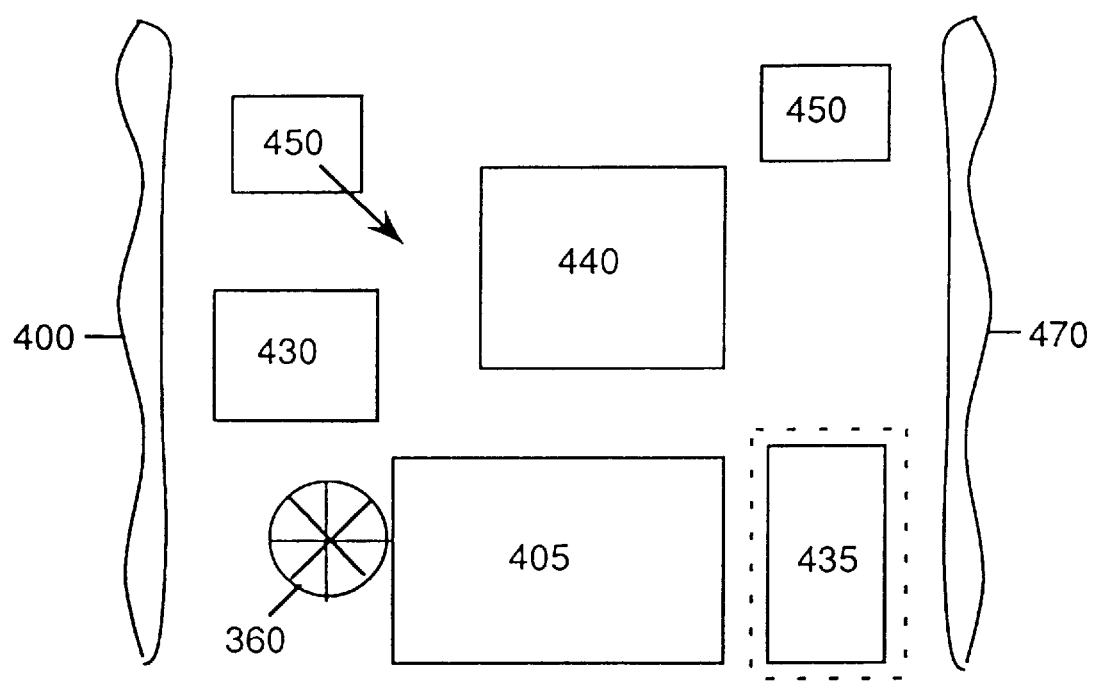

Referring to FIG. 5B, an alternate embodiment of a user visual image storage card creation system is illustrated. As illustrated in FIG. 5B, a booth 400 contains all necessary apparatus and systems to provide user development and creation and/or modification of user visual images for storage, and to provide for the storage, compression, formatting etc., to provide for storage of the user visual images onto the storage card medium. The user 440 enters the booth 400 and can pull the curtain 470 to close behind him or her so that the booth provides a private area with controlled lighting and sound environment Lighting sources 450 provide illumination onto the user 440 for capture by the video camera 430 under control of the control console 405 that can be a custom or semi-custom computerized system design, or can utilize semi-custom programming and peripherals in conjunction with a computer 435. An example of the type of computer 435 can be either a micro or minicomputer. Examples of personal computers 435 would include the Amiga computer by Commodore, the Apple Macintosh, IBM-PC or compatible, etc. The system of FIG. 5B preferably includes one or more means of image input as described with reference to FIG. 5A.

The booth 400 also contains a microphone 360 for picking up the user's voice. As described elsewhere herein, the speech parameter data is recorded for future use in synthesizing the user's voice at a later time. Memory space for the user's voice is reduced since only the important speech parameters needed to reproduce the speech are stored.

Figure 6:
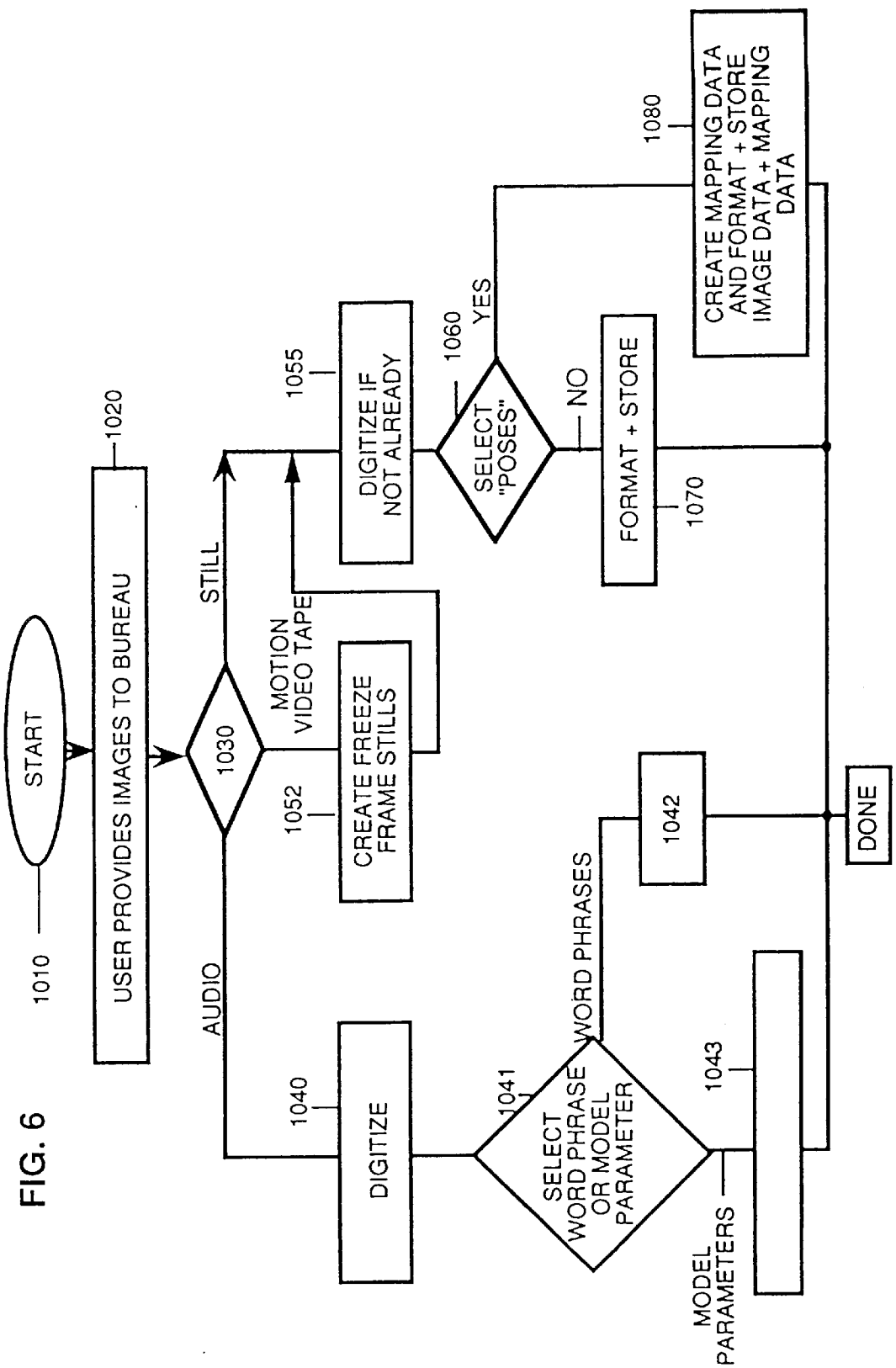
FIG. 6 illustrates a process by which an outside service bureau can be utilized to create and provide the storage card medium containing the user images, which storage card can be used with any of the systems of FIGS. 1A–G and FIGS. 2A–B, in accordance with the present invention.

Referring to FIG. 6, a flow chart illustrates the process for a service bureau creation of storage cards from user provided image data, such as VHS video tapes, eight millimeter video tapes, still photographs, floppy disks from computers containing digitized images, floppy disks from still cameras, audio inputs, and parameter data for computer generated video and audio, stored on any medium.

The use of a service bureau can extend beyond video games. These storage cards can be used for a lot more than games. They could also be used to incorporate users into new or existing movies, allow users to preview how they would look in new clothes, be used to see how various transformations (aging, etc.) would affect a user, etc. This card could plug into a variety of devices other than video games, such as teleconferencing and security.

As shown in FIG. 6, (Step 1010:) the user starts (Step 1020:) by providing the images to the service bureau. This can be done in various ways, such as an in-store program at stores that sell the video game cards, video game apparatus, systems or related materials. This can also be done via a mail-in or a walk-in service, not as part of an existing store, or via modem link. After the user has provided the images to the service bureau, different processing steps are utilized depending on the form of input (e.g., analog, digital, video still, video motion, and audio, etc.). (Step 1030:) A decision is made as to which path is taken. (Step 1040:) For audio, the input is preferably speech that is digitized and word phrases selected or model parameters extracted. (Step 1041:) If word phrases are selected, then (Step 1042;) the process provides formatting, mapping and storage of the word phrase digitized data along with the associated mapping information. Alternatively, (Step 1042:) if model parameter data is present, the model parameter data is formatted and mapped for utilization by a sound synthesizer to operate in accordance with the model parameters. (Step 1055:) If the user images are still motion, then the process continues to digitize them if not already digitized. (Step 1052:) If the user images are motion video, then they are first freeze-framed to create a still, and digitized if necessary. From there both still and motion video are processed similarly, in that (Step 1060:) a decision is made to select poses. If yes, (Step 1080:) canned poses are selected, mapping data and formatting is generated, and the image data and mapping data are stored onto the storage card medium. If no poses are selected (Step 1070:) then the image data is formatted, mapped, and stored, for use and assignment to particular game functions other than poses. If model parameter data is present, it is formatted and mapped for utilization in presentation generation.

It is to be understood that the process illustrated above with reference to FIG. 6 is exemplary and that many other options and variations are possible.

Figure 7A:
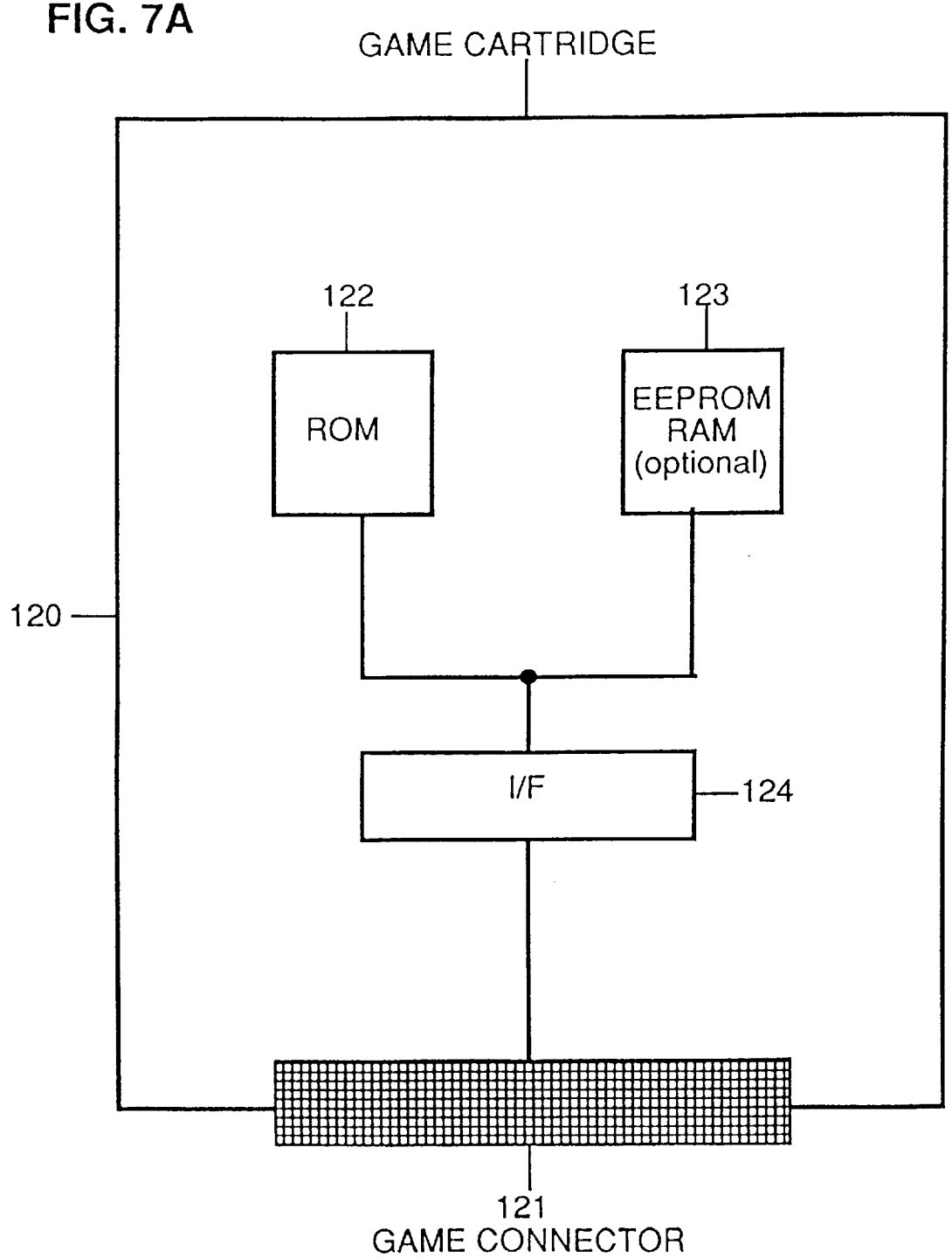
FIG. 7A illustrates a game cartridge for use with the system illustrated in FIG. 1A.

Referring to FIG. 7A, one embodiment of an apparatus by which users can input and store user image data and obtain a removable storage card medium containing user images thereon is illustrated. The game card (or cartridge) 120 of FIG. 6A includes both the nonvolatile storage memory 122 (such as ROM or EEPROM) containing the game software and logic, and a writable nonvolatile memory 123, such as RAM or EEPROM (although volatile memory could be used in those applications not requiring the memory function of memory 123 be maintained when power is removed). The memories 122 and 123 are coupled to adapter interface controller 124, that is also coupled to the game connector 121. The game cartridge illustrated in FIG. 7A is compatible with FIGS. 1B, 1C, and 1D.

Figure 7B:
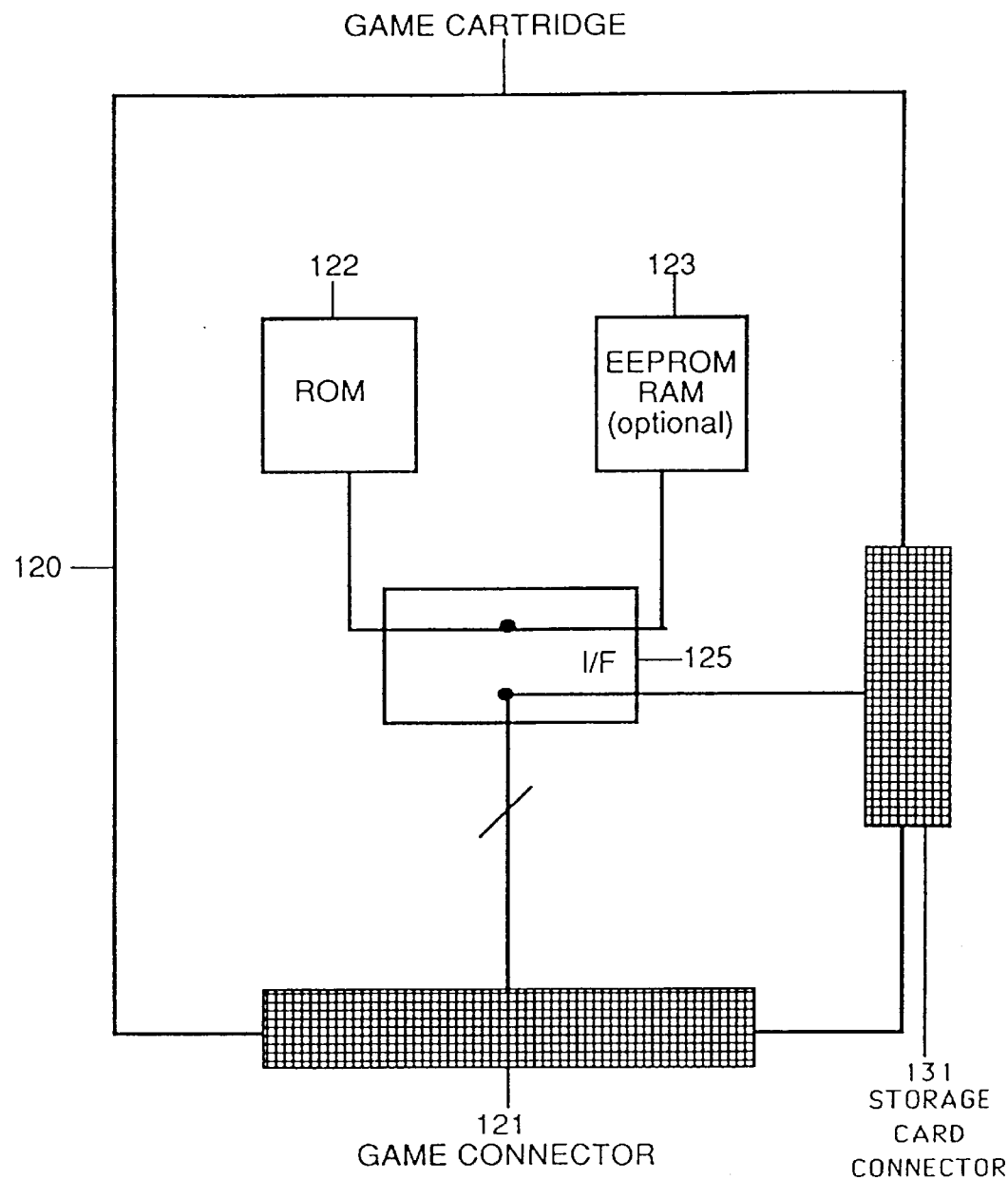
FIG. 7B illustrates a game cartridge compatible with the system illustrated in FIG. 1B, and which optionally may be used with system of FIG. 1C where the storage card is coupled to an input/output port instead of to the game cartridge, in accordance with the present invention.

Referring to FIG. 7B, an alternate game card including the storage card interface is illustrated. The game cartridge 120 of FIG. 7B is illustrated as game cartridge of 120F of FIG. 1E. The memories 122 and 123 are coupled to adapter interface 125, that is also coupled to the storage card connector 131 and to the game connector 121. The game cartridge in FIG. 7B is usable with the systems of FIGS. 1A, 1B and 1E.

It will be appreciated that numerous other configurations of game cartridges can be provided, including different use of memory, use of only a single nonvolatile storage memory without a second memory, the addition of processing power and/or control logic, etc., as the application and cost constraints dictate.

The writable memory 123 of FIGS. 7A and 7B is a variable/optional component of the game card. When present, the size of the writable memory 123 can be fixed or can vary depending upon the application or scope of applications to which it is expected to function in. The memory 123 can also provide additional processor, scratch pad and buffer memory area to support additional computational needs of the processor to support the analysis and integration process of the present invention.

Where an interface adapter unit is present, it can contain writable memory and/or additional special processors, and the memory 123 is not required to perform scratch pad memory functions for the processor if there is sufficient other memory present Additionally, in new video game or other audiovisual presentation systems, or by retrofitting old game systems, additional memory can be provided for user image integration utilization. The writable memory 123 provides local storage for the downloading of user image data, either from the storage card via direct link or via transmission downloading such as via modem, and provides for the loading and storing of the user image data into the memory 123 for retention in the game card thereafter without requirement of attachment of a storage card thereto. Thus, the user image data is thereafter accessible as a part of the game card subsystem unless and until modified.

The use of the writable memory 123 also permits machine specific considerations regarding resolution and formatting of the user image data including video resolution and video formatting as well as data structure and image mapping considerations. Additionally, machine specific considerations regarding views and rendering can be provided for.

Figure 8:
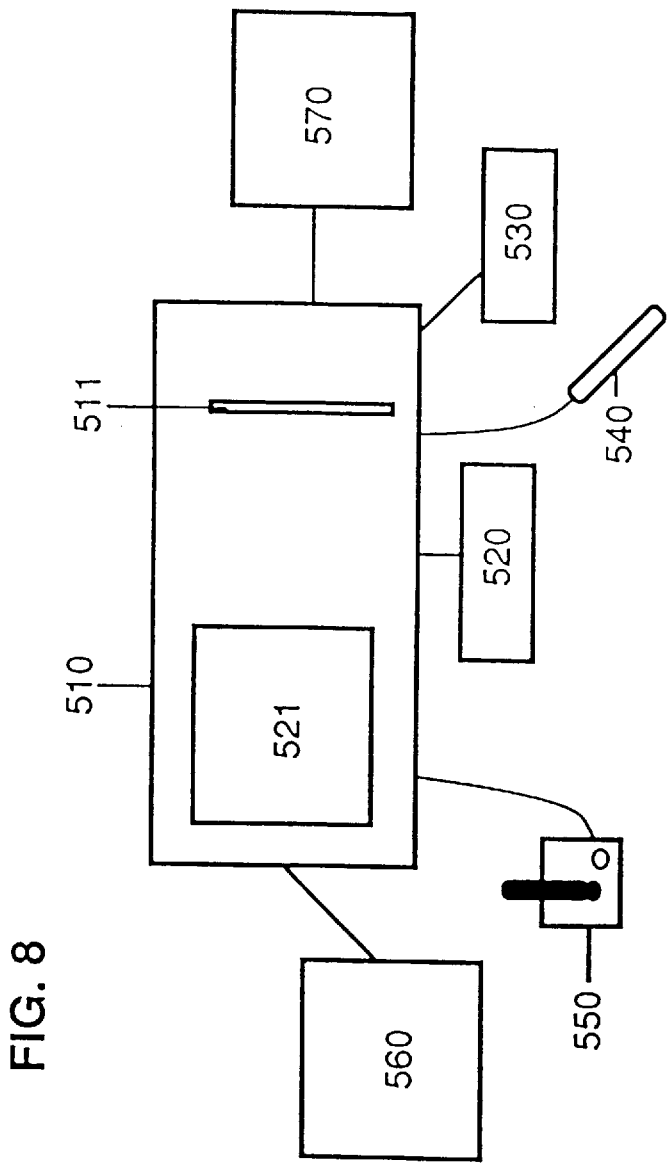
FIG. 8 illustrates a personal computer based system for one or both of user image development/storage and user image video game play employing the present invention.

Referring to FIG. 8, a system embodying the present invention is illustrated. A central computer system 510 having a secondary storage means 511 such as a disc drive or Storage Card is coupled to a keyboard 520 and a display device 521 (such as a cathode ray tube, LCD, LED, etc.). Additionally, the computer system 510 is coupled to a mouse or other input device 530, a light pen 540, a joystick 550, a document reader 560, and a camera 570. Depending on the particular needs of the user, the system can comprise less than all of these accessories, but must have some sort of user input device, such as a keyboard 520, mouse 530, light pen 540, joystick with push button 550, document reader 560, camera 570 or some other type of computer data input device such as a modem providing telephonic communication of digital data to the system.

Figure 9:
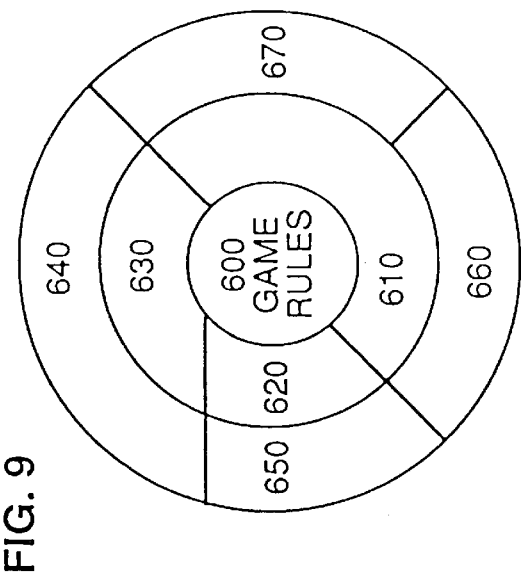
FIG. 9 illustrates the logic structure for the user image defined video game.

Referring to FIG. 9, the structure of the user defined visual image video game logic is illustrated. The center of the logic structure is the game rules 600. The game rules 600 interface with the predefined function mapping logic 610 that interfaces with both the predetermined video graphic objects 660 and the user defied videographic objects 670. The game rules utilized the predefined function mapping to access the predetermined and user defined videographic objects, which objects are then integrated into the visual display as is described hereafter. Game rules logic 600 also interfaces to the display logic 630 that interfaces to the display interface logic 640 that provides for driving the video display. The game rules logic passes the appropriate videographic objects to the display logic that interfaces to the display interface logic that provides for display of the game audiovisual presentation.

Additionally, the game rules logic also interfaces to the input/output logic 620 that interfaces to the input/output interface logic 650. The external user input/output devices for the video game, such as in joysticks, light pens, keyboards, etc. are coupled to the system via the I/O interface logic 650 that translates these inputs to a form compatible for transfer to the input/output logic 620 that couples appropriate input/output data to the game rules logic 600. The game rules logic 600 utilizes the data from the input/output logic 620, and from the videographic objects data 660 and 670 via the predefined function mapping 610, to provide for a display presentation via the display logic 630 and display interface 640.

Figure 10:
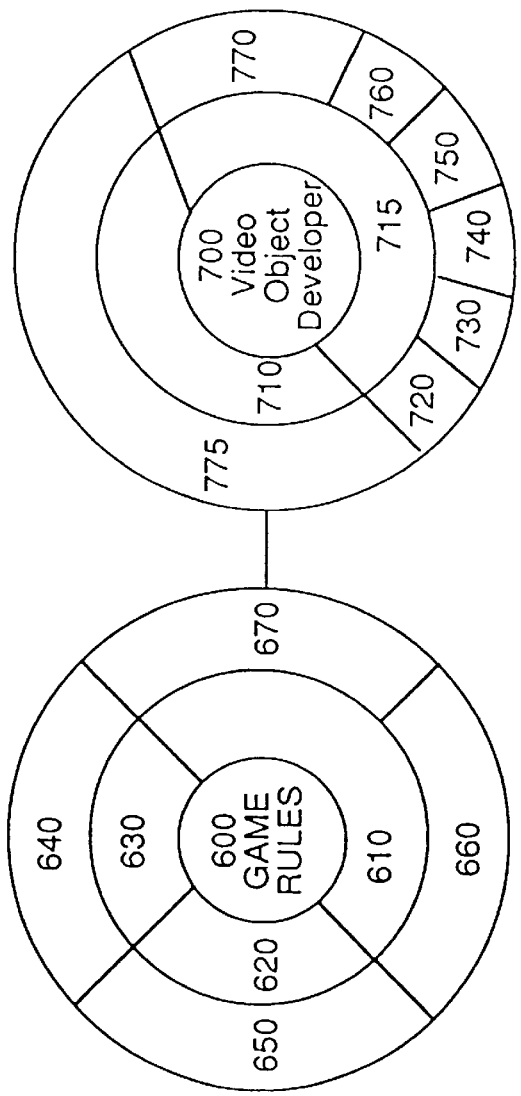
FIG. 10 illustrates the structure and interface of the game development system logic to the video game logic structure.

Referring to FIG. 10, the logical interface of the game development system of the present invention to the video game structuring logic of the present invention is illustrated. The game rules logic 600, predefined function mapping logic 610, I/O logic 620, display 630, display interface logic 640, I/O interface logic 650, predetermined videographic objects 660, and user defined videographic objects 670, of FIG. 9 are analogous to the correspondingly numbered items of FIG. 8. Further, in accordance with the present invention, the universal video game design system interfaces to the user defined videographic objects logic of the video game logic, providing for downloading of user defined videographic objects from the user visual image in video game design system to the video game logic.

The user visual image in video game development system logic is comprised of a nucleus of user video object development logic 700, that interfaces with user input interface logic 715, that interfaces with keyboard interface logic 320, mouse interface logic 730, light pen interface logic 340, joystick interface logic 750, document reader interface logic 360, and camera interface logic 730, that each interface to the respective keyboard 520, mouse 530, light pen 540, joystick 550, document reader 560, and camera 570, of FIG. 1. Additionally, where other input devices are utilized, additional interface logic will be provided. The input device thus is coupled into the universal video game development system via the interface logic 720, 730, 740, 750, 760 and/or 770, via the user input interface logic 715, that couples the data to the user video object developer logic 700.

The user video object developer logic 300 is also interfaced to the universal linker logic 710 and therefrom to the link interface logic 775 that couples the final user developed video objects to the video game system logic 570. This can be in the form of loading files onto a diskette or hard disk, or a run time loading of data directly into the computer memory prior to running of the game program on the game system. The universal linker logic 710 provides the necessary functional mapping to properly map the user developed video objects into the appropriate locations and file names for the user defined videographic object logic 670, such that the video game system will function properly.

The systems described with reference to the figures herein, can all be built from presently available technology as is necessary to implement all functions herein, including, but not limited to (1) the recognition and/or identification of Predefined Character Images and (2) the real-time User Image capture and association to the Predefined Character Images, and, (3) the integration of the User Image into the audiovisual presentation.

The multi-use entertainment amusement aspect of the present invention will now be discussed in greater detail. This use of image integration incorporates the other apparatuses and processes of the present invention to provide entertainment at an amusement park, circus, or other multi-use entertainment attraction.

An amusement park patron receives an image storage card upon entry to the facility or, in the alternative, receives it before or after entry into the facility. The storage card can additionally be used as a money debit card holding a credit for a certain amount of money that was previously paid. Thus the card can be used around the park to purchase items. The card has the built-in benefit of storing the user's image and/or speech parameters. Thus, it would be a simple matter to compare the image or speech of the card user to verify ownership at each transaction.

If the image storage card is generated upon or after entry, the patron proceeds to an image generation facility as described above and illustrated in FIG. 5B. The patron enters a room where the lighting and background can be controlled. The image generation facility creates an image (one, two, or three dimensional) of the patron, digitizes the image, and stores it on the card. This image can be a facial image or a full body image, or otherwise as discussed above herein.

At this point, the patron has the option of modifying the stored image to make it fit the video presentation in which the image will be integrated. Since the image is stored in a digital data format, it can now be manipulated by a computer graphics apparatus and process. Alternatively, an image generation computer automatically handles all processing of the image data after initial capture, or an operator of the system assists in the process.

Figure 11:
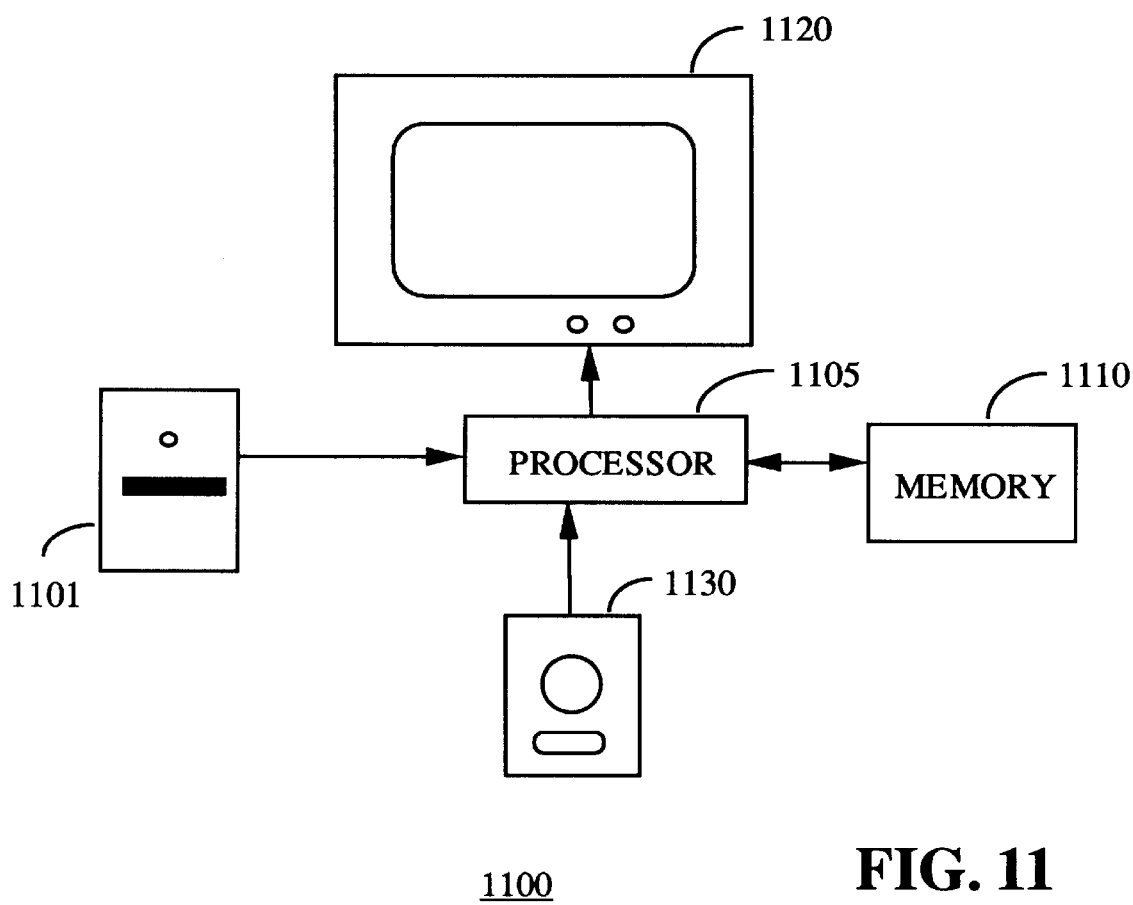
FIG. 11 illustrates a block diagram of an image manipulation apparatus of the present invention.

The preferred embodiment of the computer graphics apparatus of the present invention is illustrated in FIG. 11. The storage card is inserted into a card reader 1101. The processor 1105 that controls the apparatus reads the image and sound data from the card reader 1101. This data is stored in memory 1110 for manipulation.

If user control is permitted, the user can use the controls 1130 to choose how the image is to be manipulated. Examples of typical controls 1130 are a keyboard, a joystick, a track pad, a track ball, buttons, or any combination of the above.

The memory 1110 also contains the graphics that can be integrated into the image data. The display 1120 shows the user the selections to be made to adjust the image. The final image can also be shown on the display 1120.

Colors can be changed, clothing can be changed, and various items can be added. By manipulating the image, the user (or operator or automatically via computer) can go from the shorts and t-shirt worn into the park to a suit or dress. The attire can also be changed for each separate presentation to for example, armor, a spacesuit, beach wear, or other attire, stored in an attire library, to match the image to the video presentation in which the image will be integrated. Also, various tools or instruments that will be used in the video presentation can be added to the image from a stored library of tools or instruments.

Figure 12:
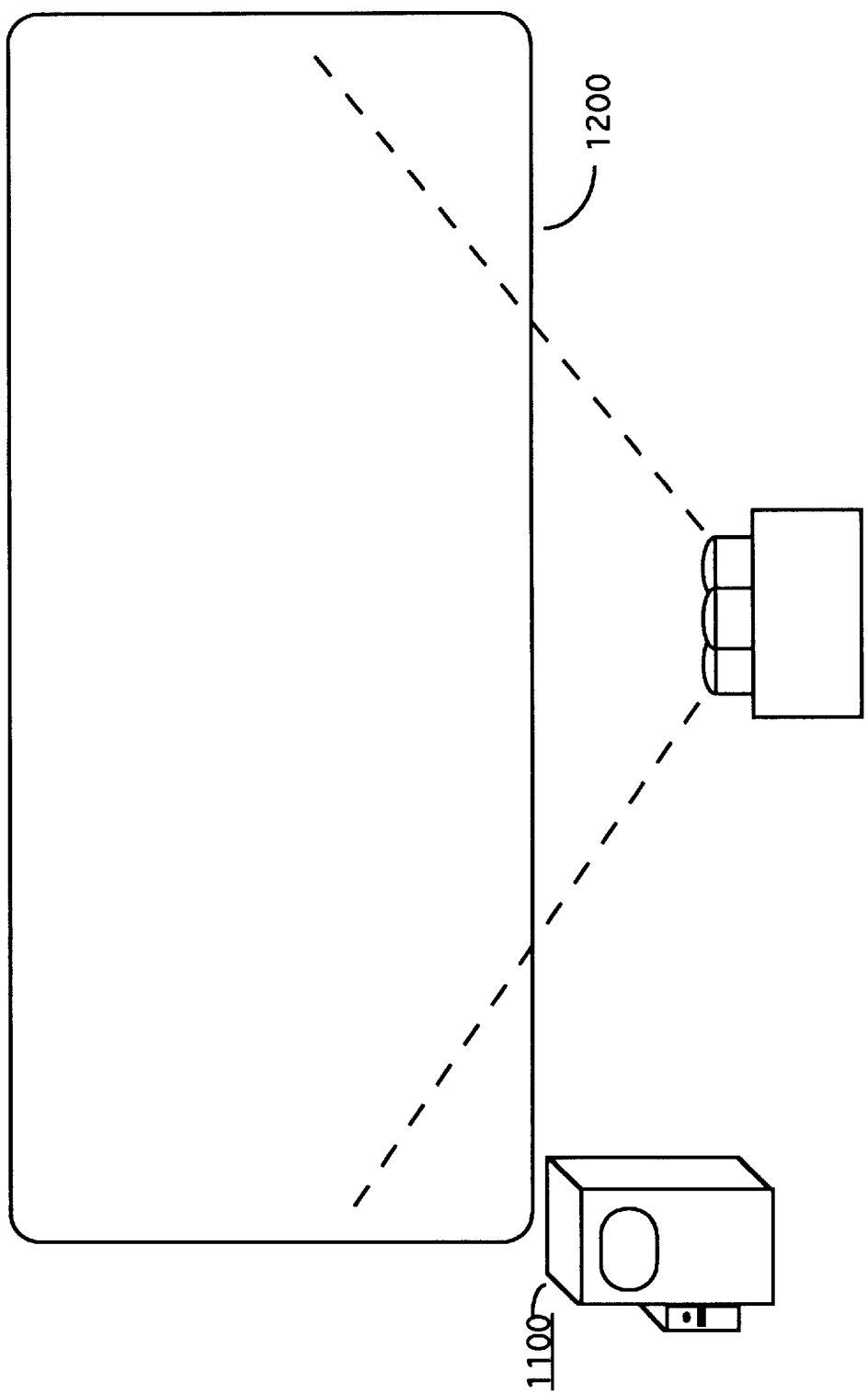
FIG. 12 illustrates an entertainment area of the present invention.

In operation, the user takes the image storage card to an entertainment area such as an exhibit on dinosaurs. An example of such an entertainment area is illustrated in FIG. 12. The card is inserted into the card reader to gain entrance to the exhibit and to ready the stored image for integration. The patron is then presented, on the computer graphics apparatus 1100, with various attires and tools associated with the exhibit, thus allowing the patron to change the image to fit the exhibit. For example, the patron may choose a caveman outfit from the attire library and a club from the tool library. The manipulated image data can be stored on the original storage card, on a new storage card, or simply kept in the memory of the image manipulator for use in that particular entertainment area of the park.

The computer associated with the exhibit then makes the changes to the stored image and integrates the altered image into the video presentation on dinosaurs. This integration is discussed previously. The patron alone, or an entire audience, can now watch the video presentation on a direct view monitor or projection screen 1200. Alternatively, the computer associated with the presentation can automatically make the appropriate changes to the stored image for each user, and the user can simply insert the card into a reader built into the amusement car of the transportation car which transports the user through the exhibit.

Additionally, using a virtual reality system, the user can wear a helmet with a built in video capability or a pair of goggles with built in video capability to view the video presentation. This places the patron in a three dimensional situation instead of watching the video presentation on a two dimensional screen. The virtual reality system also allows the user to interact with other users (e.g., to battle his friends and family) whose images have been integrated into the video production.

Also as described previously, the speech parameters of the user (patron) can be recorded at the time the image is generated. This allows the video presentation to generate dialog by simulating the user's voice and integrating it into the video presentation. The user also has the option of having their voice altered while the image is being altered.

In an alternate embodiment, the video presentation with the integrated image can be stored digitally or as analog video signals on tape for purchase by the patron. The tape or digital storage cartridge can now be taken home as a memento of the visit to the park.

Of course the above scenarios are not limited to entertainment. Businesses can use the image integration to try different marketing ideas for clothes or other accessories without spending large sums of money to produce a product.

The image integration of the present invention can also be used by the user to make a custom video game piece by piece. The user selects different storylines, characters, and images from a library stored in memory. Once the selections have been made and any alterations have been done to the user's image, the image is integrated into the customized video game where the user can control the integrated image of himself or another character.

A method of integration of a user image into a predefined audiovisual image source is provided, the method comprising the steps of providing a user image; first providing a presentation output from the audiovisual image source; then selecting a portion of the presentation output as a selected portion for user image associative integration; then analyzing the presentation output associated with the selected portion; then integrating the user image with the selected portion; and providing a modified presentation output wherein the user image is associated with and integrated into the selected portion in the presentation output.

The method is further characterized in that the user image is at least one of a video image, an audio soundtrack, sound parameters for driving a sound synthesizer, control signals, and graphics parameters for driving a graphic synthesizer. The method is further comprised of the step of providing for at least one of user original creation, modification and selection of the user image.

The method is further comprising the step of scaling the user image to fit within the selected portion.

An alternative method of integration of an image from a secondary source into a predefined audiovisual image source, the method comprising the steps of providing a presentation output from the audiovisual image source; providing a user image from the secondary source; and providing a presentation architecture having means that integrate and utilize the user image from the secondary source to participate with predefined associative actions in the presentation output as an extra actor.

The alternative method is further characterized in that the plurality of audiovisual presentations are associated with various amusement attractions.

An audiovisual presentation adapter interface system for user image integration into a presentation output is provided in accordance with the present invention, the system comprising an image system for providing user image data representative of the user image; a presentation source for providing the presentation output; a separate and removable interface adapter comprising a subsystem for selecting a portion of the presentation output as a selected portion for user image associative integration; a subsystem for analyzing the presentation output to identify the selected portion; a subsystem for associating the user image with the selected portion; a subsystem for integrating the user image data with the selected portion; and presentation apparatus for providing a modified presentation output wherein the user image is integrated to form a part of the modified presentation output.

The presentation source means is comprised of storage means structured in a predefined architecture arranged to have identifiable images indexed within the predefined architecture, the system further comprising means for providing one or more user image data packets, each having an associated user image, each with its own index, indexed within the predefined architecture; means for selecting a particular identifiable image from the identifiable images as the selected portion; means for selecting at least one of the user image data packets as selected user image data for association with the particular identifiable image; means for integrating the selected user image data into the predefined architecture by substituting the index of the selected user image data for the index of the particular identifiable image; and wherein the presentation means provides an integrated presentation output as the modified presentation output responsive to the predefined presentation image data and the selected user image data, comprising images wherein the selected user image is associated with the particular identifiable image.

The interface adapter means is adapted for coupling to an audio-visual system providing for output of a presentation including a predefined character having a default behavior pattern of displayed behavior responsive to the user, wherein the interface system is further comprised of means for modifying the default behavior pattern of the predefined character responsive to a measured physiological response of the user during presentation and wherein the presentation output is altered in response to the measured physiological response.

The video game software provides the predefined presentation image data, the system further comprising a user input apparatus responsive to user provided stimulus, and a video game apparatus responsive to the video game software and the user input apparatus, for providing video game play and a video game presentation that has one or more predefined game display functions selectively associated with the particular identifiable image, which interact in the video game presentation, the interface system further comprising a subsystem for selectively associating one of the predefined game display functions with the particular identifiable image for incorporation into the video game audiovisual presentation responsive to the user image and to the user actively playing a video game.

A method of integrating a user voice image into an audiovisual presentation of a video game, the method comprising the steps of sampling a user's voice; analyzing the sampled user's voice to provide user voice parameter data representative of the user voice image; storing the user voice parameter data; synthesizing and interjecting the user's voice into the video game audiovisual presentation responsive to the user voice parameter data comprising the step of associating a particular predefined character image within the video game presentation with the user's voice so that when the particular predefined character is speaking, the user voice parameter data is input as a model to a voice synthesizer which effects the integration of the user's voice into the audio portion of the audiovisual presentation as associated with the predefined character image.

A video game interface system comprising an interface subsystem for coupling to an existing video game system providing a presentation output comprising predefined images, the interface subsystem being separate and removable from the video game; user image storage subsystem containing data for a user image for association with a selected predefined image; the interface subsystem comprising a subsystem for analyzing the requests for predefined images to identify a request for the selected predefined image; and a subsystem for intercepting the requests for the selected predefined image and substituting the user image in place of the predefined image data, wherein the user image is associated with and replaces the selected predefined image in the presentation output.

The user image data can be provided as an image data packet. A family of different video games each with its own unique predefined video game display presentation is provided, wherein within the family each different video game provides user image integration compatibility responsive to the image data packet. Predetermined user actions are detected during active play of the video game during selected portions of the video game display presentation. The user image is integrated into the video game display presentation for selective associative substitution of the user image in place of the selected predefined image only responsive to the predetermined user actions.

The user image can be comprised of a plurality of user images from which one or more user images are selectively integrated into the modified presentation output. The image data packet can be comprised of the user image data and header data related thereto. The video game system provides default game response rules, and in one embodiment monitors user biological signals and modifies the default game response rules responsive to the monitoring. The user image is further associative with parameter data, permitting for altering the user image data for texture wrapping of the user image onto the selected portion so as to effectively wrap the user image over the selected portion responsive to the parameter data.

The user image is further associative with behavioral profile rule data, for permitting adjustment to behavioral performance of the selected predefined displayed image in the video game responsive to the behavioral profile rule data. The presentation subsystem integrates and utilizes the user image to participate in the presentation output as an extra actor. The presentation subsystem can be comprised of one of a video tape player, a video disc player, a video game, and a computing system.

The subsystem for analyzing is further comprised of means for providing at least one of signature analysis, signal analysis, timing analysis, state analysis, and transform analysis.

A video game system is comprised of writable memory; application software including default character image data having an associated default character address; a subsystem for providing a video game presentation of video game play responsive to the application software comprising a default video game presentation comprising default character images having associated addresses, responsive to no selection of a user image; a non-volatile storage subsystem for storing an image data packet (IDP) file representative of a user image; a subsystem for linking the DP file from the storage subsystem for combinational mapping into the application software for the video game; and a subsystem for integrating the IDP file and the user image into the presentation of the video game play; a subsystem for selecting the user image data for inclusion in the presentation; a subsystem for selecting one of the default character images as a selected default character image; a subsystem for providing key data associated with the user image data, and a subsystem for integrating the user image data into the video game presentation wherein the user image data is integrated responsive to the key data, wherein the key data is utilized to load a mapping table within the writable memory providing an index for direct interception and substitution wherein the user image data is output in place of the selected default character image.

The system is further comprised of a subsystem providing for selection of the user image for inclusion in the modified presentation output, wherein the user image is associated with a unique user image display function which is only present in response to the selection of the user image. The system is further characterized in that the user image is stored on a storage card, the system comprising a subsystem for storing video game play parameters for end of game on the storage card prior to ending active game play; and a subsystem for resuming video game play from a point in game rules and logic for the end of game responsive to the video game play parameters stored on the storage card.

The user image data is mapped into an allocated predefined address space that is otherwise unused by the video game system and the application software, such that the user image is directly addressed by the system, and wherein an address space map table is provided which permits direct addressing of the user image data by the video game system wherein the user image is integrated into the video game display presentation.

The user image can be of at least one of color, size, graphics, shape, a digitized image of the user's face, a user created original image, and a user selected one of a predetermined set of visual images. The system can automatically integrate as a part of a game initialization procedure of the application software, whereafter the IDP files remain integrated in the video game until changed.

The application software is comprised of an address map table of displayable graphic functions, the system further comprising logic for selecting a selected one of the displayable graphics functions, and character selection logic providing for association of the user image with the selected displayable graphic function in the audiovisual presentation, responsive to the address map table.

The displayable graphic functions can be comprised of default displayable graphic functions and non-default displayable graphic functions created especially to utilize the user image, wherein the video presentation is comprised of a default video presentation comprised of the default displayable graphic functions, and a non-default video presentation comprised of both the default and the non-default displayable graphic functions and provided responsive to the character selection means.

An adapter interface system for coupling to a video game system comprising video game application software providing for a self-contained video game having an associated predefined audiovisual presentation, is comprised of a non-volatile storage medium containing data stored as one or more image data packets; selection logic for selecting one or more of the image data packets for integration into the video game; and image integration logic for linking the one or more selected image data packets into the application software wherein the image data packets and the application software together become an integral self-contained video game having an associated audiovisual presentation adapted from the predefined audiovisual presentation and the selected image data packets.

The image data packets can be linked to one or more game functions wherein the image data packets are incorporated into the overall video game presentation in association with the game function in combination with a predefined set of complimentary audiovisual segments. For example, the linking can be comprised of combinational mapping and integrating.

An audiovisual presentation system providing a presentation output is taught, comprising a subsystem for providing a user image, and an integration subsystem for mapping the user image into the presentation output as an extra actor with predefined associative actions wherein the user image becomes a part of the presentation output.

The predefined presentation output can be comprised of at least two predefined presentation outputs comprised of a default predefined presentation output having default predefined character images with associated default predefined actions, and a user image predefined presentation output, wherein the user image predefined presentation output is comprised of the default predefined presentation output with the addition of the integration of an extra actor predefined character with associated predefined actions uniquely associated with only the user image.

The system can further be comprised of subsystems for providing audiovisual presentation data for the audiovisual presentation; for identifying defined portions of the audiovisual presentation data for integration with the formatted user-image data; for integrating the formatted user image data with the defined portions of the audiovisual presentation data to provide integrated image data; and for providing an integrated audiovisual presentation responsive to the integrated image data. This audiovisual presentation can be associated with a video game system operating responsive to a predefined stored game program having a structure wherein the formatted user image data is selectively mapped to be associated with a predefined game function.

An expander permits simultaneous coupling of multiple ones of the user image storage means, so as to permit each of the user image storage means to have a respective user image associated with a respective different predefined image and an interface subsystem providing means for the video game system to separately identify and utilize each of the multiple user image storage means and the user images stored thereon. The presentation architecture has means that provide for a plurality of independent presentations, each separate and distinct from each other wherein each integrates the user image from the secondary source to participate in the presentation as an extra actor. A plurality of secondary sources can each have a separate extra actor separately participating in the presentation. The user image is stored onto a separate and removable storage means.

The user visual image storage means can be at least one of a separate removable transportable cartridge, solid state memory, and a compact disk read only memory.

An entertainment system is taught, comprising an audiovisual source for providing signals to be viewed as a presentation; a presentation system for displaying the signals responsive to the audiovisual source; storage means for storing a user image; and a controller for analyzing the signals, and for selectively modifying the signals to integrate the user image with predefined associative actions into the presentation.

The presentation can include predefined characters and predefined images, wherein the user image interacts with the predefined characters and predefined images after the user image is integrated into the presentation. The system can include means for generating a user image, such as a camera for generating at least one image of the user, the image being in the form of analog video signals; an audio transducer for generating an analog audio signal; and a converter for converting the analog video and audio signals to digital video and audio signals capable of being stored on the storage means. The user image can participate in the presentation as an extra actor. The storage card can be used as a means for admittance into one or more entertainment areas. A plurality of independent audiovisual sources can each associate with a respective one of a plurality of independent ones of the presentation system. Also taught herein is a method of integrating a user voice image into a presentation output, the method comprising the steps of sampling a user's voice; analyzing the sampled user's voice to provide user voice parameter data representative of the user voice image; storing the user voice parameter data; and synthesizing and interjecting the user's voice into the presentation output responsive to the user voice parameter data comprising the step of associating a particular predefined character image within the presentation with the user's voice so that when the particular predefined character is speaking, the user voice parameter data is input as a model to a voice synthesizer that effects the integration of the user's voice into the presentation output as associated with the predefined character image.

A video interface system is taught, comprising a subsystem for coupling to an existing video system comprising software providing requests for predefined images; a subsystem for providing a presentation comprising the predefined images; storage containing data for a user image for association with a selected predefined image, the storage being removable and transportable from the video interface system; and an intercept adapter interface system comprising a subsystem for analyzing the requests for predefined images to identify a request for the selected predefined image, and a subsystem for intercepting the requests for the selected predefined image and substituting the data for the user image in place of the predefined image, wherein the user image is associated with and replaces the selected predefined image in the presentation.

The software is stored in a software cartridge. The system is coupled to (a) a host video system that provides the presentation, (b) to the software cartridge, and (c) to the storage means. The intercept adapter system is further comprised of logic for associating the user image with a selected associated predefined character image; analysis logic for analyzing the data associated with the selected associated predefined character image and selectively modifying certain ones of the data to substitute therefor the associated user image data; and a subsystem for providing the substituted user image data to the presentation for use therein, wherein the user image is associated with and replaces the selected predefined character image in the presentation.

A system is taught for integrating an image from a secondary source into a predefined audiovisual image source, comprising subsystems for providing a presentation output from the audiovisual image source; for providing a user image from the secondary source; and for providing a presentation architecture having means that integrate and utilize the user image from the secondary source to participate with predefined associative actions in the presentation output as an extra actor.

A system is also taught for integrating a user image into a predefined audiovisual image source presentation output, comprising a source for providing a user image; a subsystem for selecting an image portion of the presentation output as a selected portion for user image associative integration; a subsystem for analyzing the presentation output associated with the selected portion; a subsystem for integrating the user image with the selected image portion; and a subsystem for providing a modified presentation output wherein the user image is associated with and integrated into the selected image portion in the presentation output. The audio-visual system can provide an interactive video game, a movie, etc.

While there have been described above various embodiments of distributed video game systems for the purpose of illustrating the manner in which the invention can be used to advantage, it will be appreciated that the invention is not limited to the disclosed embodiments. Accordingly, any modifications, variation, or equivalent arrangement within the scope of the accompanying claims should be considered to be within the scope of the invention.

What is claimed is:

1. An amusement entertainment system having image integration capability, having at least one separate entertainment area, the system comprising:

a storage card capable of digitally storing image data, the storage card being transportable and usable in wherein said at least one separate entertainment area;

said at least one separate entertainment area has an image integration subsystem comprising:

a card reader for reading the image data stored on the storage card;

storage means for storing and retrieving predefined image data;

a processor, coupled to said card reader and said storage means, responsive to the read image data and the retrieved predefined image data to produce modified image data;

said system further comprising at least one of an audio source and a visual source for providing signals for at least one of an audio and visual presentation;

means for analyzing said signals, for selectively modifying certain ones of the signals to integrate said modified image data into said presentation to provide a modified presentation; and exhibition means for exhibiting said modified presentation.

2. The system as in claim 1, wherein there are a plurality of the separate entertainment areas each having a separate respective one of the integration subsystems.

3. The system as in claim 1, wherein the image data is comprised of at least one of data from an image generator for generating image data of a user, and data from a speech parameter sampler for determining speech parameter data of a user's speech.

4. The system as in claim 3, wherein the modified data is utilized to enable the image data of a user to participate in said presentation as a synthetic actor.

5. The system as in claim 1, wherein the storage card is usable as a means of admittance into at least one of the entertainment areas.

6. The system of claim 1, wherein said presentation is comprised of a plurality of predefined characters and images and the image data of a user interacts with the predefined characters and images.

7. The system of claim 1, further comprising at least one sensor for monitoring movement of the storage card within and altering the respective presentation for the at least one of the plurality of entertainment areas in response to the monitoring of the movement.

8. The system as in claim 6, further comprising memory for storing at least a portion of said presentation in a memory space, wherein the image data of a user is automatically mapped into the memory space, so as to override associated ones of the predefined characters and images.

9. The system as in claim 1, wherein at least one of the entertainment areas has associated therewith ancillary attribute data;

wherein the image data has a default presentation, wherein the image data of a user is integrated with the ancillary attribute data in accordance with predefined rules so as to modify the default presentation associated with the image data in the modified presentation.

10. The system as in claim 1, further comprising:

means for permitting a user to select at least one of various attires, tools, and other images from a library of images.

11. The system as in claim 1, wherein said source for providing signals is an audiovisual source, and wherein said presentation is an audiovisual presentation.

12. The system as in claim 1, further characterized in that there are a plurality of entertainment areas including said at least one separate entertainment area.

13. The system as in claim 1, further characterized in that there are a plurality of said separate entertainment areas, each one of said plurality compatible with and responsive to said storage card.

14. A method for integrating an image into a predefined audiovisual presentation in a system having a plurality of entertainment areas, the method comprising the steps of:

generating a user image;

storing the user image on a storage medium, the storage medium being transportable and usable in each of the plurality of entertainment areas;

coupling the storage medium to an interface in at least one of the entertainment areas;

providing signals for an presentation, from an source; and analyzing the signals from the audiovisual source and selectively modifying certain ones of the signals to integrate the user image into the audiovisual presentation.

15. The method of claim 14 and further comprising the step of:

storing the modified presentations on a removable transportable storage medium.

16. A presentation system comprising:

a transportable apparatus comprising means for providing first image data;

at least one image integration subsystem comprising:

means for reading the first image data from said transportable apparatus;

predefined image data means for providing a supply of predefined image data;

source means comprised of at least one of an audio source and a visual source for providing presentation signals for a presentation;

a processor, responsive to the read first image data and the predefined image data to create modified image data, said processor further comprising means responsive to said modified image data and said presentation signals, to create modified presentation signals representative of a modified presentation; and exhibition means, responsive to the modified presentation signals for exhibiting said modified presentation.

17. The system as in claim 16, wherein said processor further provides means for analyzing said presentation signals for selectively modifying selected ones of said presentation signals to selectively integrate said modified image data into said presentation to create said modified presentation.

18. The presentation system of claim 16, wherein said modified image data comprises ancillary attribute image data.

19. The presentation system of clam 16 wherein said ancillary attribute image data comprises data associated with at least one of clothing, tools, physical appearance, and weapons.

20. The system as in claim 18, wherein the source provides said presentation signals for one of an audio, a video, and an audiovisual presentation.

21. The presentation system as in claim 16, wherein the modified image data is audio parameter data representative of at least one of voice characteristics, speech characteristics, and sound characteristics, and wherein the audio signal that the source provides is modified by the image data to provide the modified image data.

22. The system as in claim 16 wherein the predefined image data is provided by the source means.

23. The system as in claim 16, wherein at least one of the presentation signals is modified by the image data to provide the modified image data.

24. The system as in claim 16, further comprising a liquid crystal display for providing a visual presentation responsive to the modified presentation signals.

25. The system as in claim 24, further comprising a video input device for providing video image data as the first image data.

26. The system as in claim 25, wherein the exhibition means provides at least one of a video display, and an output of digitized video data representative of the modified presentation signals.

27. The system of claim 26 wherein the transportable apparatus is the video input device.

28. The system as in claim 26, wherein the video input device is a digital camera.

29. The system as in claim 28, wherein a user input provides for user modification of the first image data and the predefined presentation data to provide the modified presentation signals.

30. The system as in claim 16, wherein the predefined presentation data is comprised of at least one of graphic data, video game presentation data, and video data.

31. The system as in claim 16 wherein the exhibition means provides at least one of a video display, a memory storage card, a magnetic storage apparatus, an image input transducer, and an output of digitized video data representative of the modified presentation signals.

* * * * *